(12) United States Patent
Aktas et al.

(10) Patent No.: US 11,292,367 B2
(45) Date of Patent: Apr. 5, 2022

(54) SWIVEL PLATE ASSEMBLY

(71) Applicant: Ford Global Technologies, LLC, Dearborn, MI (US)

(72) Inventors: Macit Aktas, Windsor (CA); Cung K. Chieu, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/060,673

(22) Filed: Oct. 1, 2020

(65) Prior Publication Data

US 2021/0016689 A1    Jan. 21, 2021

Related U.S. Application Data

(63) Continuation of application No. 16/130,349, filed on Sep. 13, 2018, now Pat. No. 10,836,279.

(51) Int. Cl.
| | |
|---|---|
| *B60N 2/14* | (2006.01) |
| *B60N 2/30* | (2006.01) |
| *B60N 2/12* | (2006.01) |
| *B60N 2/06* | (2006.01) |

(52) U.S. Cl.
CPC ............... *B60N 2/146* (2013.01); *B60N 2/06* (2013.01); *B60N 2/12* (2013.01); *B60N 2/143* (2013.01); *B60N 2/3038* (2013.01)

(58) Field of Classification Search
CPC . B60N 2/146; B60N 2/06; B60N 2/12; B60N 2/143; B60N 2/3038; B60N 2/14; B60N 2/304; B60N 2/3063; B60N 2/2869

USPC .................................................. 297/344.22
See application file for complete search history.

(56) References Cited

U.S. PATENT DOCUMENTS

| | | |
|---|---|---|
| 2,779,642 A | 1/1957 | Matthews |
| 2,854,065 A | 9/1958 | Fox |
| 3,025,116 A | 3/1962 | McMahan, Jr. |
| 3,570,800 A | 3/1971 | Cycowicz |
| 4,401,287 A | 8/1983 | Moeser |
| 4,792,188 A | 12/1988 | Kawashima |
| 4,846,529 A | 7/1989 | Tulley |
| 4,893,871 A | 1/1990 | Kowalski |
| 5,482,354 A | 1/1996 | Gryp |
| 5,782,451 A | 7/1998 | Carnahan et al. |
| 5,810,441 A | 9/1998 | Ezuka et al. |
| 5,857,744 A | 1/1999 | LaPointe et al. |
| 6,015,188 A | 1/2000 | Yundt et al. |
| 6,021,989 A | 2/2000 | Morita et al. |
| 6,575,420 B2 | 6/2003 | Koshida et al. |
| 2003/0160488 A1 | 8/2003 | Kim et al. |
| 2003/0230870 A1 | 12/2003 | Sabol |
| 2004/0066074 A1 | 4/2004 | Ovitt |
| 2009/0127908 A1 | 5/2009 | Kucharski et al. |
| 2010/0253123 A1 | 10/2010 | DeCraene et al. |
| 2011/0109135 A1 | 5/2011 | Davis, Jr. et al. |
| 2017/0320406 A1 | 11/2017 | Roeglin et al. |
| 2020/0086769 A1 | 3/2020 | Aktas et al. |

*Primary Examiner* — Mark R Wendell
(74) *Attorney, Agent, or Firm* — Vichit Chea; Price Heneveld LLP

(57) ABSTRACT

A swivel plate assembly is provided that comprises a first swivel plate coupled to a second swivel plate. Each of the first and second swivel plates includes a first portion and a second portion. A channel is defined by the first swivel plate and the second swivel plate. A ball bearing assembly is positioned within the channel. A ball bearing of the ball bearing assembly is positioned substantially flush with the first and second swivel plates.

17 Claims, 32 Drawing Sheets

SWIVEL PLATE ASSEMBLY

CROSS-REFERENCE TO RELATED APPLICATION

The present application is a continuation of U.S. patent application Ser. No. 16/130,349, filed on Sep. 13, 2018, entitled "SWIVEL PLATE ASSEMBLY," now U.S. Pat. No. 10,836,279, the disclosure to which is hereby incorporated herein by reference in its entirety.

FIELD OF THE DISCLOSURE

The present disclosure generally relates to a swivel plate assembly and, more particularly, to a swivel plate assembly for a vehicle seat.

BACKGROUND OF THE DISCLOSURE

Currently, seating assemblies include a seat base and a pivotable seatback. With the introduction of autonomous vehicles and reconfigurable interiors, occupants are interested in the development of new seating designs that allow forward passengers to face the rear and allow passengers to easily maneuver the seating assemblies to provide ingress/egress and storage.

SUMMARY OF THE DISCLOSURE

According to one aspect of the present disclosure, a swivel plate assembly includes a first swivel plate coupled to a second swivel plate. Each of the first and second swivel plates includes a first portion and a second portion. A space is defined by the first swivel plate and the second swivel plate. A ball bearing assembly is positioned substantially flush with one of the first and second swivel plates.

Embodiments of the first aspect, or of any other disclosed aspect, of the disclosure can include any one or a combination of the following features:
- a first portion of a first swivel plate is fixedly coupled to a first portion of a second swivel plate and a second portion of the first swivel plate is fixedly coupled to a second portion of the second swivel plate;
- a first portion of a first swivel plate is coupled to a first portion of a second swivel plate by welding and a second portion of the first swivel plate is coupled to a second portion of the second swivel plate by welding;
- second portions of first and second swivel plates are circumferentially encompassed by first portions of the first and second swivel plates, respectively, and the second portions of the first and second swivel plates are rotatable relative to the first portions of the first and second swivel plates;
- one of first and second portions of first and second swivel plates includes an angled edge positioned to abut a ball bearing assembly;
- one of first and second swivel plates defines a plurality of fastener spaces configured to receive fasteners to couple a swivel plate assembly with a seating assembly;
- a first portion of a first plate is aligned with a first portion of a second plate and a second portion of the first plate abuts a second portion of the second plate; and/or
- a rotation feature is positioned within a cavity at least partially defined by a second plate.

According to another aspect of the present disclosure, a swivel plate assembly includes a first swivel plate coupled with a second swivel plate. The first swivel plate includes a first inner portion engaged with a second inner portion of the second swivel plate, and the first swivel plate includes a first outer portion at least partially encompassing the first inner portion and a second outer portion at least partially encompassing the second inner portion. A space is defined between the first swivel plate and the second swivel plate. A rotation assembly is positioned within the space and is in contact with one of the first and second swivel plates. The rotation assembly is configured to facilitate low friction rotation of the second swivel plate relative to the first swivel plate.

Embodiments of this aspect, or of any other disclosed aspect, of the disclosure can include any one or a combination of the following features:
- a rotation assembly is one of a ball bearing assembly and a lubricant layer;
- a plurality of brackets are coupled with a first swivel plate and extend at least partially over a second swivel plate to maintain engagement of the second swivel plate with the first swivel plate;
- a first inner portion of a first swivel plate defines a receiving feature configured to at least partially receive a second inner portion of a second swivel plate; and/or
- a second swivel plate includes a rim at least partially defining a space.

According to another aspect of the present disclosure, a swivel plate assembly includes a first swivel plate coupled to a second swivel plate. Each of the first and second swivel plates includes a first portion and a second portion. A channel is defined by the first swivel plate and the second swivel plate. A ball bearing assembly is positioned within the channel. A ball bearing of the ball bearing assembly is positioned substantially flush with the first and second swivel plates.

Embodiments of this aspect, or of any other disclosed aspect, of the disclosure can include any one or a combination of the following features:
- a swivel plate assembly includes a locking assembly positioned on a second swivel plate and including a pair of pins spaced a first distance apart and extending from a release lever; and a first pair of receiving spaces defined by the second swivel plate and spaced a second distance apart, the first distance being equal to the second distance;
- a first pair of receiving spaces is spaced apart by a center wall, and each of a pair of pins is substantially flush with the center wall partially defining each of the pair of receiving spaces when the pair of pins is engaged with the pair of receiving spaces;
- a first portion of a first swivel plate is fixedly coupled to a first portion of a second swivel plate, and a second portion of the first swivel plate is fixedly coupled to a second portion of the second swivel plate;
- a first portion of a first swivel plate is coupled to a first portion of a second swivel plate by welding, and a second portion of the first swivel plate is coupled to a second portion of the second swivel plate by welding;
- second portions of first and second swivel plates are circumferentially encompassed by first portions of the first and second swivel plates, and the second portions of the first and second swivel plates are rotatable relative to the first portions of the first and second swivel plates; and/or
- one of first and second portions of first and second swivel plates includes an angled edge positioned to abut a ball bearing assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
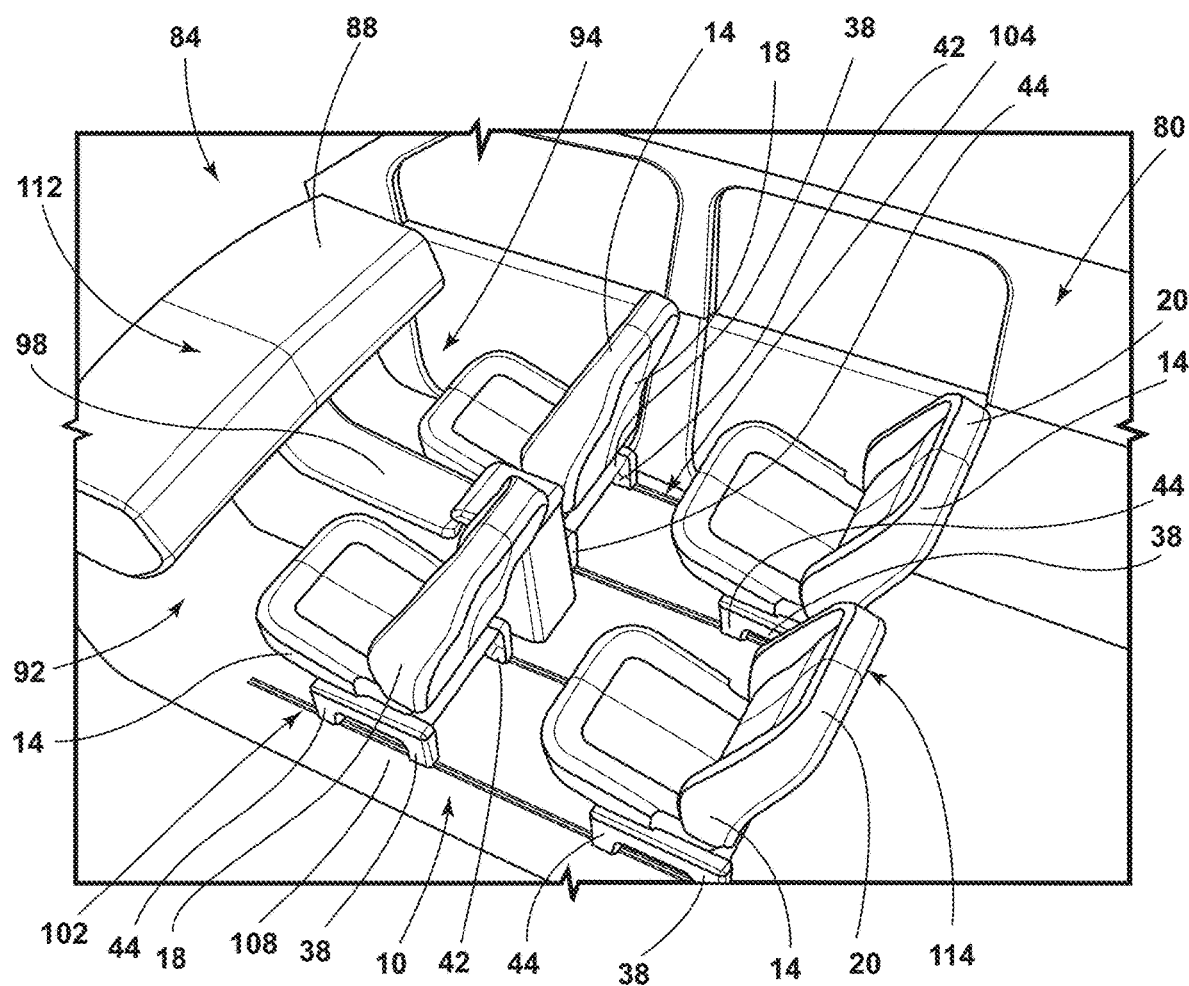
FIG. 1 is a top perspective view of a vehicle interior having a seating system disposed therein with all of a plurality of seating assemblies in a first position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-31A, reference numeral 10 generally designates a seating system including a plurality of seating assemblies 14 having first and second-row seating assemblies 18, 20. Each seating assembly 14 includes a cradle 24 pivotally coupled to a seat base 28 at a first pivot 30 and to a seatback 32 at a second pivot 34. The seat base 28 is movable between first and second positions. The seating assembly 14 further includes a base 38 having first and second supports 42, 44 and a swivel plate assembly 48. The swivel plate assembly 48 includes first and second frames 52, 54. The first frame 52 is fixedly includes to the base 38 and the second frame 54 is fixedly coupled to the cradle 24. The swivel plate assembly 48 further includes first and second swivel plates 58, 60, the first swivel plate 58 fixedly coupled to the first frame 52 and the second swivel plate 60 operably coupled to the second frame 54. The second swivel plate 60 is configured to allow the cradle 24 to rotate between first and second positions relative to the base 38. The seating system 10 further includes a track assembly 102, 104. The first and second supports 42, 44 of the base 38 are slidably coupled to the track assembly 102, 104.

Referring again to FIG. 1, the seating system 10 is shown disposed within an interior 80 of a vehicle 84. A console 88 extends from a first side portion 92 of the interior 80 to a second side portion 94 of the interior 80. A center stack portion 98 extends vehicle rearward from the console 88 and partially separates the first side portion 92 and the second side portion 94 of the interior 80 of the vehicle 84. In the illustrated example, the seating system 10 is positioned within an autonomous vehicle, specifically a sports utility vehicle (SUV). However, it will be understood that the illustration is exemplary only and the seating system 10 may be utilized in any type of vehicle 84, such as, for example, a car, a truck, a van, etc. Additionally, it will be understood that the vehicle 84 may be autonomous or configured for a driver without departing from the scope of the present disclosure.

The seating system 10 includes the plurality of seating assemblies 14. According to various examples, the seating assembly 14 may be slidably coupled to first and second track assemblies 102, 104. The first track assembly 102 may be positioned on the first side portion 92 of the interior 80 of the vehicle 84, and the second track assembly 104 may be positioned on the second side portion 94 of the interior 80 of the vehicle 84. Each of the first and second track assemblies 102, 104 are operably coupled to a floor 108 of the vehicle 84 and include a first end 106 positioned in a front portion 112 of the vehicle 84 and a second end 110 positioned in a rear portion 114 of the vehicle 84. It will be understood by those skilled in the art that the track assemblies 102, 104 may extend the entirety of the vehicle 84 or extend for only a portion of the vehicle 84. Additionally, it will be understood that the vehicle 84 may include only a single track assembly 102 with some seating assemblies 14 being fixedly coupled to the floor 108 of the vehicle 84.

Each of the first and second track assemblies 102, 104 may include a first-row seating assembly 18 positioned on first end 106 of the respective track assembly 102, 104 in the front portion 112 of the vehicle 84. Each of the first and second track assemblies 102, 104 further may include a second-row seating assembly 20 positioned on second end 110 of the respective track assembly 102, 104 in the rear portion 114 of the vehicle 84. Each of the seating assemblies includes the base 38 having first and second supports 42, 44 slidably coupled to the respective track assembly 102, 104. It is contemplated that the concept set forth in this disclosure may be utilized in a vehicle 84 configured to have multiple rows of seating assemblies, for example, a three row configuration or a four row configuration.

Figure 2A:
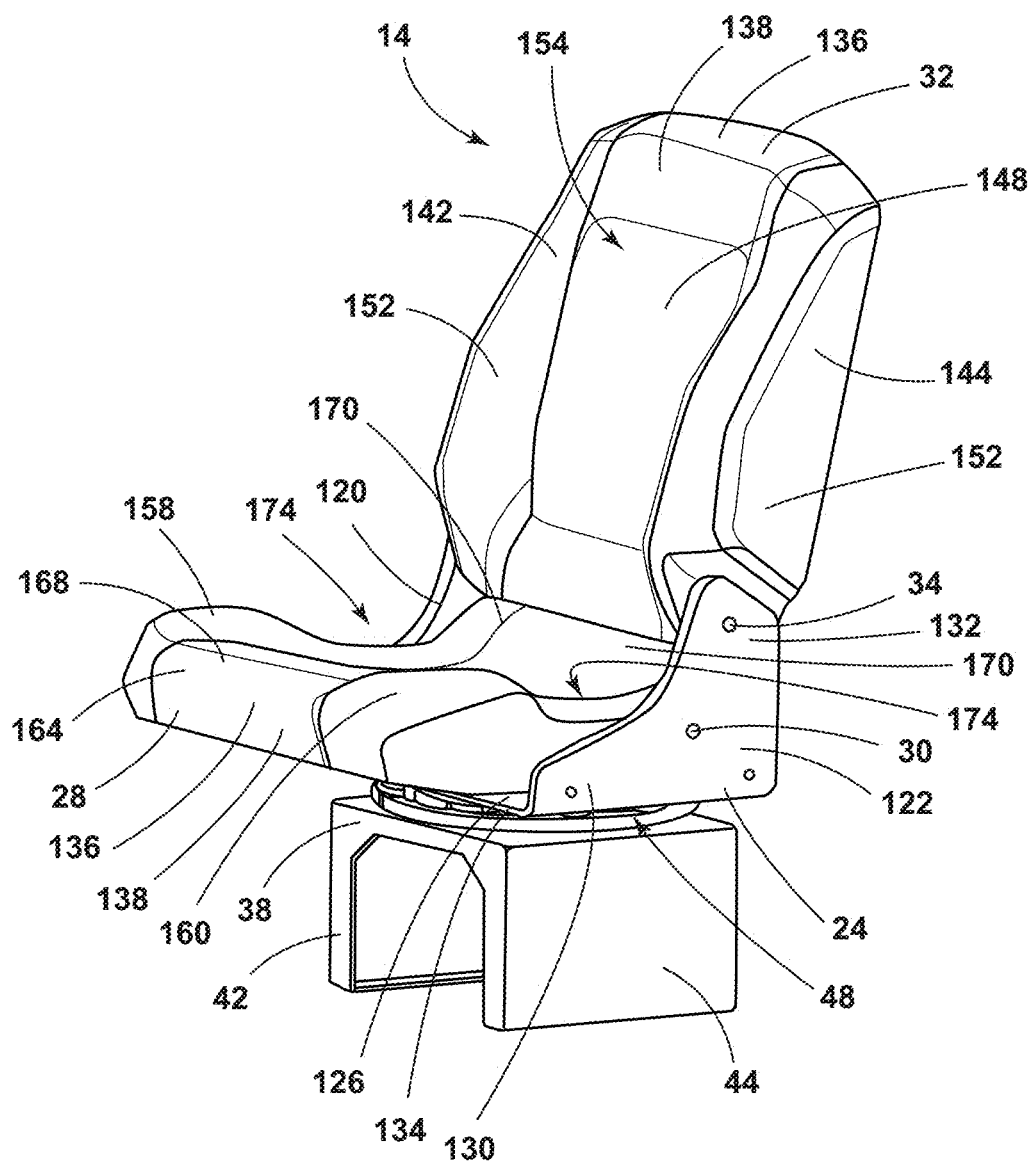
FIG. 2A is a side perspective view of one of the plurality of seating assemblies of the seating system of FIG. 1 according to some examples.
Figure 2B:
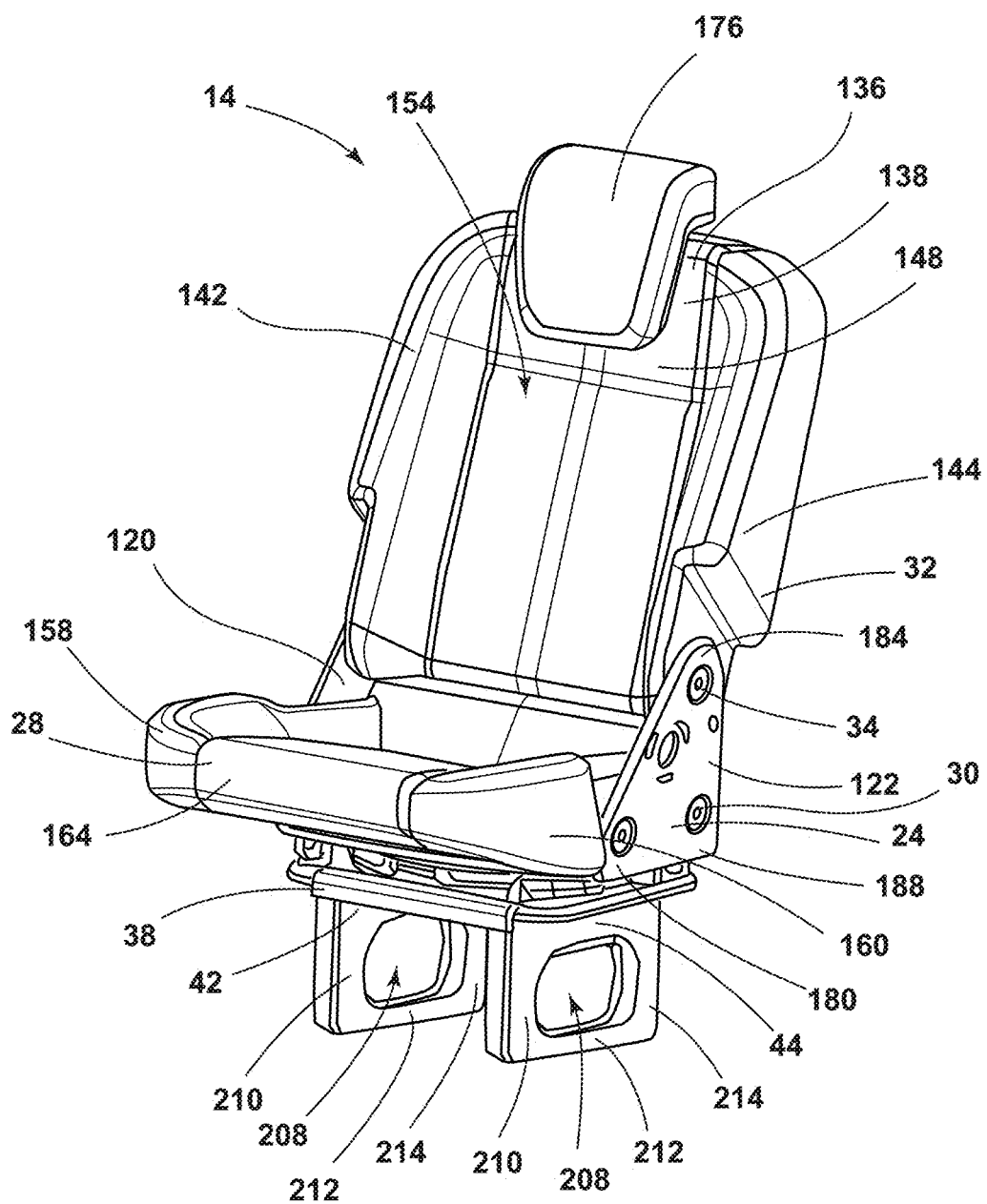
FIG. 2B is a side perspective view of a second example of one of the plurality of seating assemblies of the seating system of FIG. 1 according to some examples.

Referring now to FIGS. 2A and 2B, one of the plurality of seating assemblies 14 is shown in the design position having the seat base 28 in the first position and the seatback 32 in a position between the upright position and the reclined position. As shown in FIG. 2A, in some examples, the cradle 24 includes a first end portion 120 and a second end portion 122 joined by a bottom portion 126 extending below the seat base 28. Each of the first and second end portions 120, 122 includes a first extension 130 and a second extension 132. The first extension 130 of each of the first and second end portions 120, 122 extends along and may be integrally formed with an edge 134 of the bottom portion 126. The first pivot 30 is positioned between the first and second extensions 130, 132, and the second pivot 34 is positioned on the second extension 132. Each of the first pivot 30 and the second pivot 34 are rotatable independent of the other. This allows the seat base 28 to be rotated between the first and second positions separately from the seatback 32 and the seatback 32 to be rotated between the reclined and upright positions separately from the seat base 28. The bottom portion 126 may be configured to operably couple to the swivel plate assembly 48. More specifically, the bottom portion 126 may be configured to be coupled to the second frame 54 of the swivel plate assembly 48. According to various examples, the bottom portion 126 may be directly coupled to second frame 54 of the swivel plate assembly 48 (see FIG. 2B). In other examples, the bottom portion 126 may be configured to couple directly to the swivel plate assembly 48 without the use of a second frame 54 (see FIG. 2A).

As shown in FIG. 2B, in some examples, the first and second end portions 120, 122 of the cradle 24 may be generally triangular having a first corner 180, a second corner 184, and a third corner 188. The first corner 180 and the third corner 188 may be positioned aligned with the edge 134 of the bottom portion 126. The first pivot 30 is positioned between the first corner 180 and the second corner 184 while the second pivot 34 is positioned on the second corner 184. As discussed elsewhere herein, the separate first and second pivots 30, 34 allow the seat base 28 to be rotated between the first and second positions separately from the seatback 32 and the seatback 32 to be rotated between the reclined and upright positions separately from the seat base 28. It will be understood that the shape of the first and second end portions 120, 122 of the cradle 24 as illustrated in FIGS. 2A and 2B are exemplary only. It is contemplated that the first and second end portions 120, 122 may be any shape configured to allow separate rotation of the seat base 28 and the seatback 32 without departing from the scope of the present disclosure.

As shown in FIG. 2A, in various examples, the seating assembly 14 may include cushioning 136 covered by trim stock 138 positioned on the seat base 28 and the seatback 32. The cushioning 136 may include first and second lateral seatback cushions 142, 144 framing a middle seatback cushion 148. Each of the first and second lateral seatback cushions 142, 144 may each include a curved portion 152 where the curved portion is positioned to frame a torso space 154 for a passenger. The cushioning 136 may also include first and second lateral seat base cushions 158, 160 framing a middle seat base cushion 164. The first and second lateral seat base cushions 158, 160 may each include a raised front portion 168 and a raised rear portion 170. The raised front portions 168 and the raised rear portion 170 define a space 174 configured to receive the curved portions 152 of the first and second lateral seatback cushions 142, 144 to allow the seat base 28 and the seatback 32 to sit substantially flush when the seat base 28 is in the second position and the seatback 32 is in the upright position (see FIGS. 5A-5D).

As shown in FIG. 2B, in some examples, the cushioning 136 may include the first and second lateral seatback cushions 142, 144 framing a middle seatback cushion 148 where the first and second lateral seatback cushions 142, 144 are generally linear. The middle seatback cushion 148 may be receded into the seatback, forming the torso space 154. Similarly, the first and second lateral seat base cushions 158, 160 may be generally linear to complement the linear first and second lateral seatback cushions 142, 144. In various examples, the seating assembly 14 may further include a headrest 176 positioned on the seatback 32 and included with the cushioning 136. In other examples, the headrest 176 may be integrally formed with the seatback 32 and the cushioning 136 to form a single continuous piece having the seatback 32 and headrest 176. It will be understood that the configuration of the cushioning 136 as illustrated in FIGS. 2A and 2B are exemplary only and any configuration may be used that allows the seat base 28 to be positioned substantially flush with the seatback 32 when the seat base 28 is in the second position and the seatback 32 is in the upright position.

As shown in FIG. 2B, the seating assembly 14 may include the first and second supports 42, 44. Each of the first and second supports 42, 44 may include a first portion 210 and a second portion 214 configured to at least partially define a space 208. The space 208 may be of various shapes and sizes, depending on the positioning and angles of the first and second portions 210, 214 of the first and second supports 42, 44. According to various examples, the first portion 210 and the second portion 214 may be substantially parallel (see FIG. 2B). Where the first and second portions 210, 214 are substantially parallel, the space 208 formed by each of the first and second supports 42, 44 may be generally square or rectangular. In other examples, one of the first portion 210 and the second portion 214 may be positioned at an incline relative to the other of the first portion 210 and the second portion 214 (see FIGS. 3 and 4). Where one of the first and second portions 210, 214 is positioned at an incline relative to the other of the first and second portion 210, 214, the spaces 208 formed by each of the first and second supports 42, 44 may be generally trapezoidal.

Referring now to FIGS. 1-4, according to some examples, the first and second portions 210, 214 of each of the first and second supports 42, 44 may be joined by a bottom portion 212 positioned parallel to the respective track assembly 102, 104. The first and second supports 42, 44 are operably coupled to the respective track assembly 102, 104 so that the seating assemblies 14 are translatable fore and aft along the respective track assembly 102, 104. According to some examples, the first and second supports 42, 44 may be directly coupled to the respective track assembly 102, 104. In other examples, the base 38 may be operably coupled to a slider of the track assembly without departing from the scope of the present disclosure.

Figure 3:
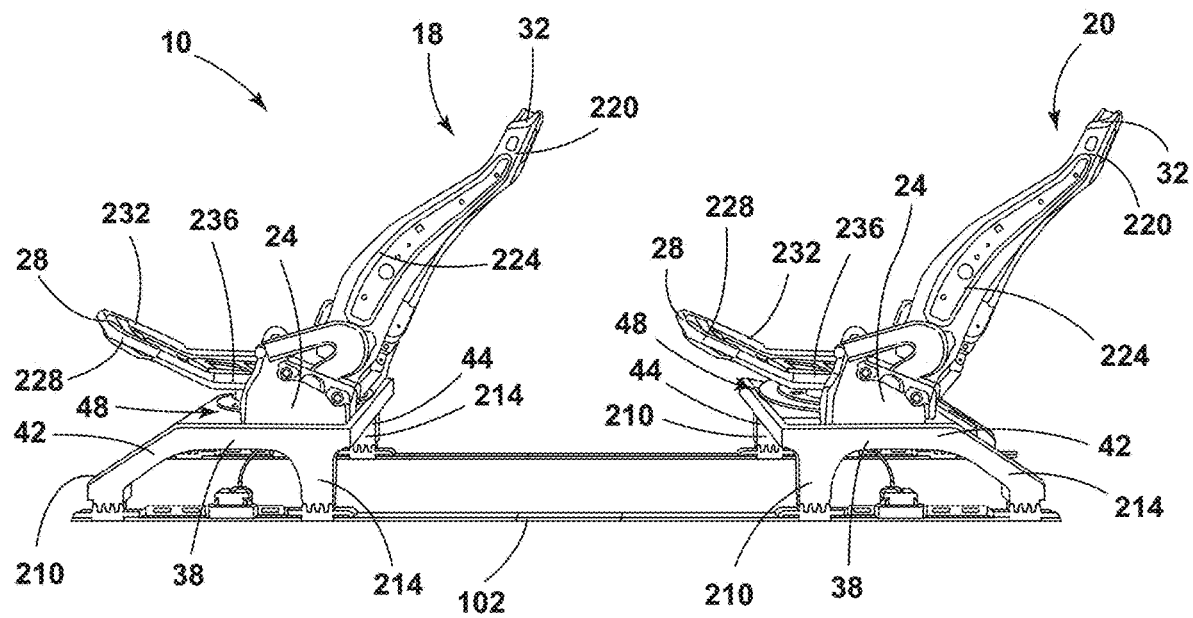
FIG. 3 is a side profile view of a plurality of seating assemblies operably coupled to a track.
Figure 4:
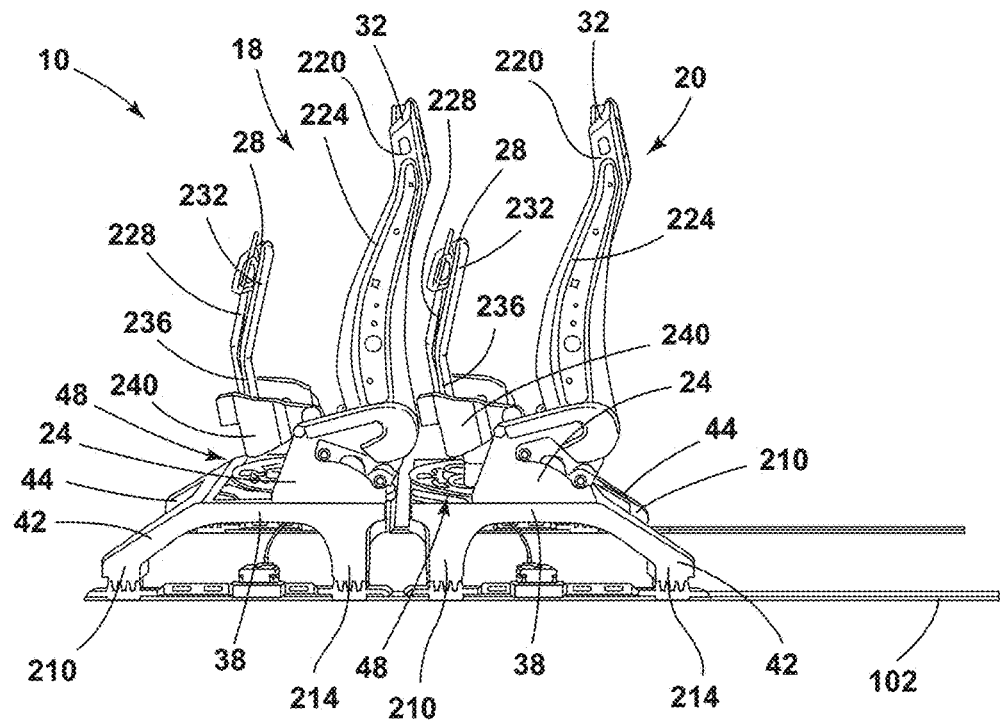
FIG. 4 is a side profile view of the plurality of seating assemblies operably coupled to the track of FIG. 3 and positioned on a first end of the track.

According to various examples, the seating system 10 may include the front row seating assemblies 18 and the second-row seating assemblies 20 (FIG. 1). FIGS. 3 and 4 illustrate the first track assembly 102 having the respective front seating assembly 18 and the rear seating assembly 20 of FIG. 1. As shown in FIGS. 3 and 4, the seatback 32 includes a seatback frame 220. In various examples, the seatback frame 220 may be nonlinear and include a lumbar portion 224. The first pivot 30 may be positioned on one of the ends of the lumbar portion 224, allowing the seatback frame 220 to rotate relative to the cradle 24. Similarly, the seat base 28 may include a seat base frame 228 having a first portion 232 and a second portion 236. The first portion 232 is positioned at an angle relative to the second portion 236 when viewed from the side profile. The angle is predetermined to mirror the lumbar curve 224 to allow the first portion 232 and the second portion 236 to be substantially parallel to the seatback frame 220 when the seat base 28 is in the second position and the seatback 32 is in the upright position. In other words, the seat base 28 includes the frame 228 having the first portion 232 and the second portion 236, the second portion 236 extending diagonally upward from the first portion 232, and further wherein an angle formed by the first portion 232 and the second portion 236 is large enough to align with a lumbar portion 224 of the seatback 32.

The seat base frame 228 may be operably coupled to a guide 240 shaped to mirror the first and second end portions 120, 122 of the cradle 24. The guide 240 rotates the seat base frame 228 upward from the first position (FIG. 3) to the second position (FIG. 4) while maintaining space between the seat base frame 228 and the seatback frame 220 for the cushioning 136 and trim stock 138, as described in FIGS. 2A and 2B.

As shown in FIGS. 3 and 4, the front row seating assemblies 18 may each include first and second supports 42, 44 each having the respective first portions 210 and second portions 214. The front row seating assemblies 18 may have the first portion 210 of each of the first and second supports 42, 44 inclined relative to the second portion 214 of the respective first or second support 42, 44. The second portion 214 of the first and second supports 42, 44 may remain perpendicular to the track assembly 102. Similarly, the second-row seating assemblies 20 may each include first and second supports 42, 44 each having the respective first portions 210 and second portions 214. The second-row seating assemblies 20 may have the first portion 210 of each of the first and second supports 42, 44 positioned perpendicular to the track assembly 102. Similarly, the second portion 214 of the first and second supports 42, 44 may be inclined relative to the first portion 210 of the respective first or second support 42, 44. When the second-row seating assemblies 20 are slid forward on the track assembly 102, the first portions 210 of the first and second supports 42, 44 are parallel with the second portions 214 of the first and second supports 42, 44 of the front row seating assemblies 18. When one of the first and second portion 210, 214 of each of the first and second supports 42, 44 of the base 38 is perpendicular to the track assembly 102, the front and second row seating assemblies 18, 20 may be positioned substantially flush, as shown in FIG. 4.

Referring now to FIGS. 5A-5D, the seating system 10 is shown disposed within the interior 80 of the vehicle 84. The plurality of seating assemblies 14 of the seating system 10 are slidably coupled to the first and second track assemblies 102, 104 by the respective supports 42, 44 of the base 38. While only the front seating assembly 18 of the second track assembly 104 is shown in the various operable positions, it will be understood that any of the plurality of seating assemblies 14 may be movable in the same way. It will further be understood that the entirety of the seating assemblies 14 may be positioned on one track assembly 104.

Alternatively, a portion of the plurality of seating assemblies 14 may be positioned on the track assembly 104 while a portion of the plurality of seating assemblies 14 may be fixedly coupled to the floor 108 of the vehicle 84.

Figure 5A:
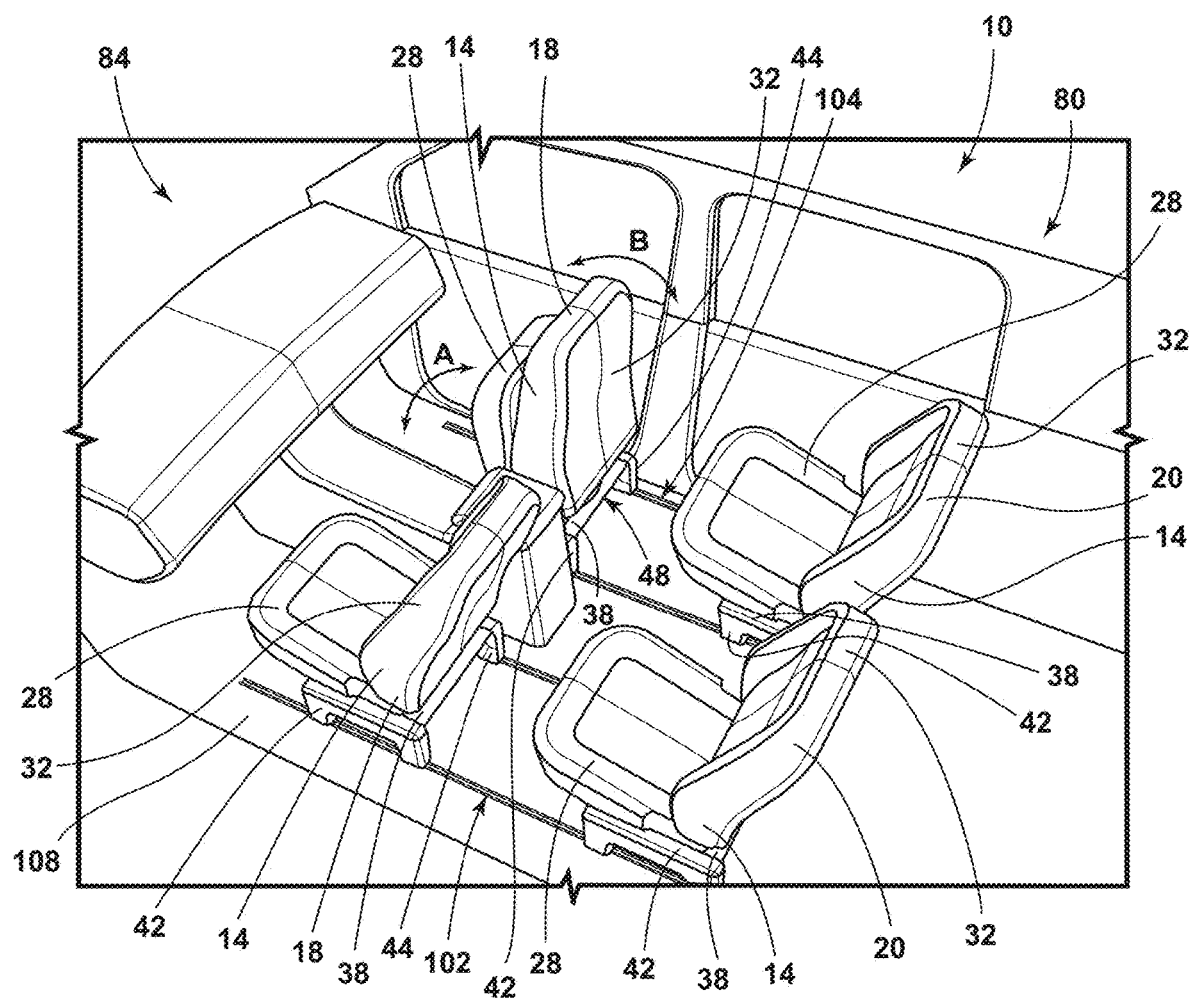
FIG. 5A is a top perspective view of the vehicle interior having the seating system of FIG. 1 with one of the seating assemblies of the seating system is in a second position.
Figure 5B:
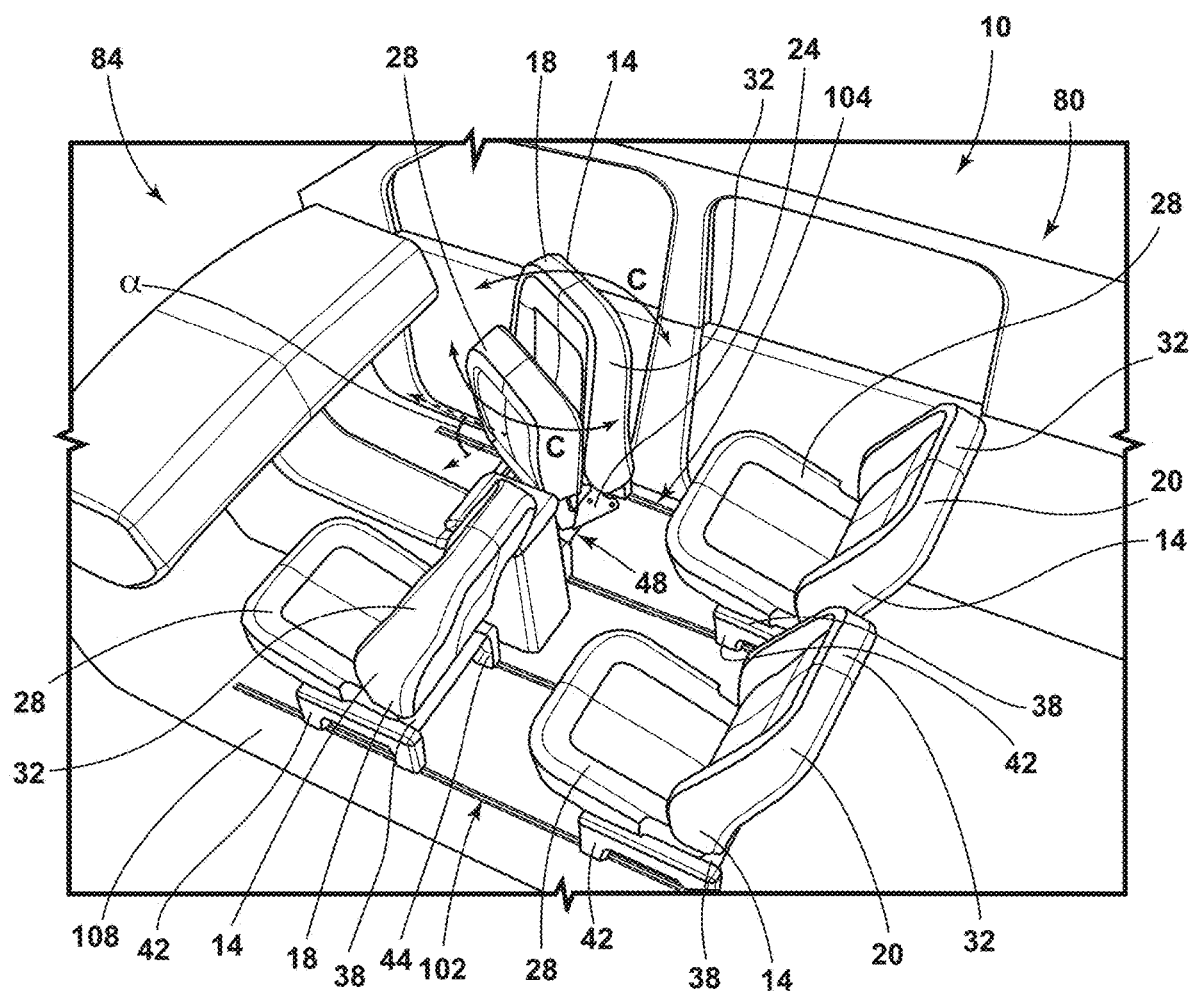
FIG. 5B is a top perspective view of the vehicle interior having the seating system of FIG. 1 with one of the seating assemblies of the seating system in a third position.
Figure 5C:
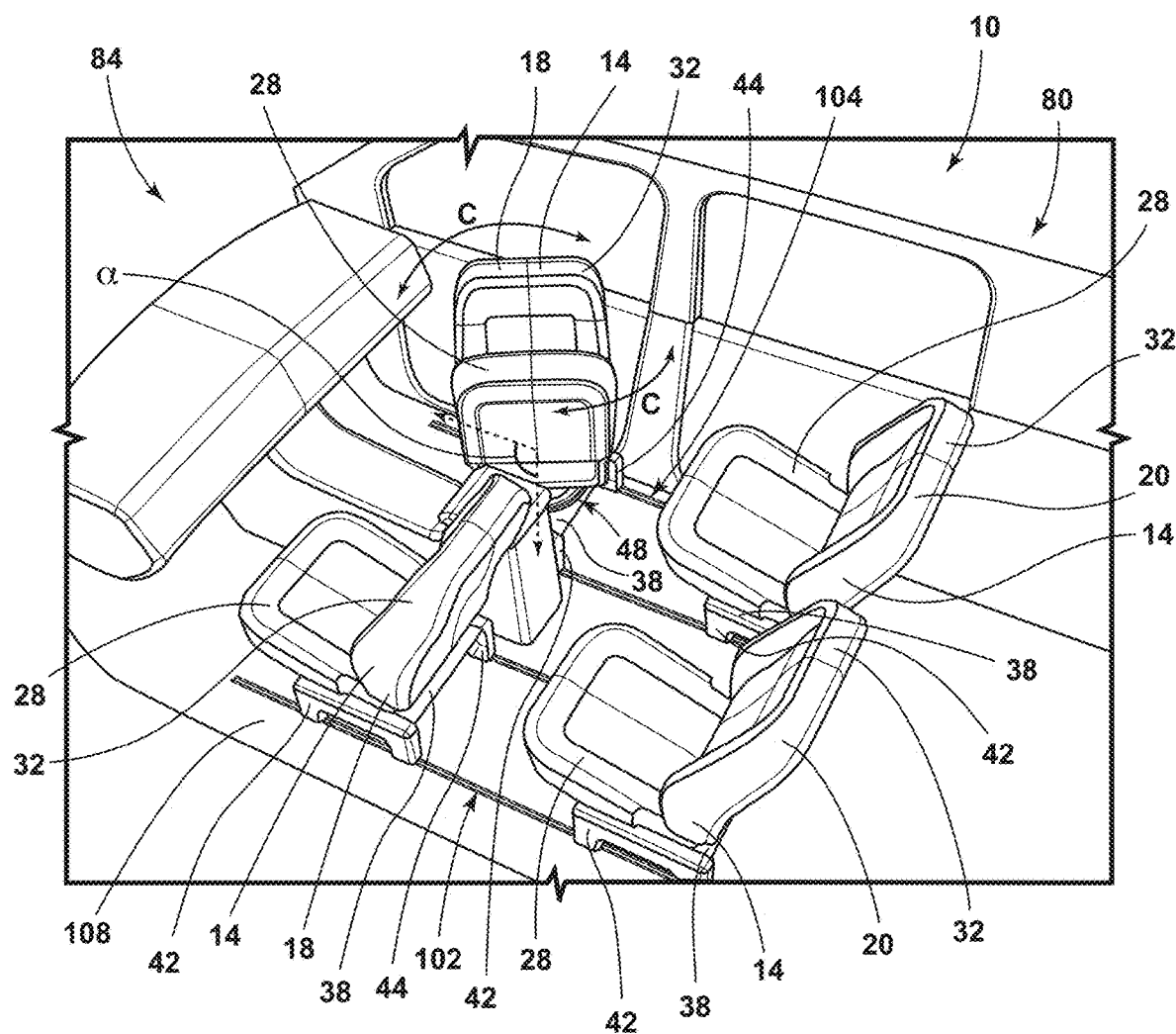
FIG. 5C is a top perspective view of the vehicle interior having the seating system of FIG. 1 with one of the seating assemblies of the seating system in a fourth position.

As shown in FIG. 5A, and as previously discussed elsewhere herein, each seating assembly 14 includes the seat base 28 and the seatback 32. The seat base 28 is rotatably coupled to the base 38 having the first and second supports 42, 44 by the swivel plate assembly 48. The seat base 28 is movable between the first position and the second position along a path illustrated by arrow A. When the seat base 28 is in the first position, the seat base 28 is parallel to the floor 108 of the vehicle 84 and is in the design position of the seating assembly 14 (see FIG. 1). When the seat base 28 is in the second position, as shown in FIG. 5A, the seat base 28 is perpendicular to the base 38. The seatback 32 is movable between the upright position and the reclined position along a path illustrated by arrow B. When the seating assembly 14 is in use, the seatback 32 may be reclined at various angles along the path illustrated by arrow B. When the seatback 32 is in the upright position, the seatback 32 is positioned perpendicular to the floor 108 of the vehicle 84 and is substantially parallel to the seat base 28 when the seat base 28 is in the second position.

Referring now to FIGS. 5A-5D, when the seat base 28 is in the second position and the seatback 32 is in the upright position, the swivel plate assembly 48 of the seating assembly 14 is rotatable along a path illustrated by arrows C. According to various examples, the seating assembly 14 may be positioned in an angled position, where the swivel plate assembly 48 is positioned at any angle α between a forward position (see FIG. 5A) and the rearward position (see FIG. 5D). In other examples, the seating assembly 14 may have predetermined angles α of rotation selectively engageable by a user. The predetermined angles may include about 10 degrees relative to the forward position to about 170 degrees relative to the forward position, or any range or combination of angles therebetween. In various examples, the seating assembly 14 is rotatable into a conversation position (see FIG. 5C). The conversation position locates the seating assembly 14 at an angle α about 15 degrees to about 20 degrees from the forward position or about 195 degrees to about 200 degrees from the forward position in either a clockwise or counterclockwise direction. In other words, the seating assembly 14 is in the conversation position when the swivel plate assembly 48 is in the angled position such that the seat base 28 is positioned at an angle α between a range of about 15 degrees to about 75 degrees relative to one of the forward and rearward positions. It will be understood that the seating assembly 14 may be rotatable on the swivel plate assembly 48 in a clockwise direction or in a counterclockwise direction without departing from the scope of the present disclosure.

Figure 5D:
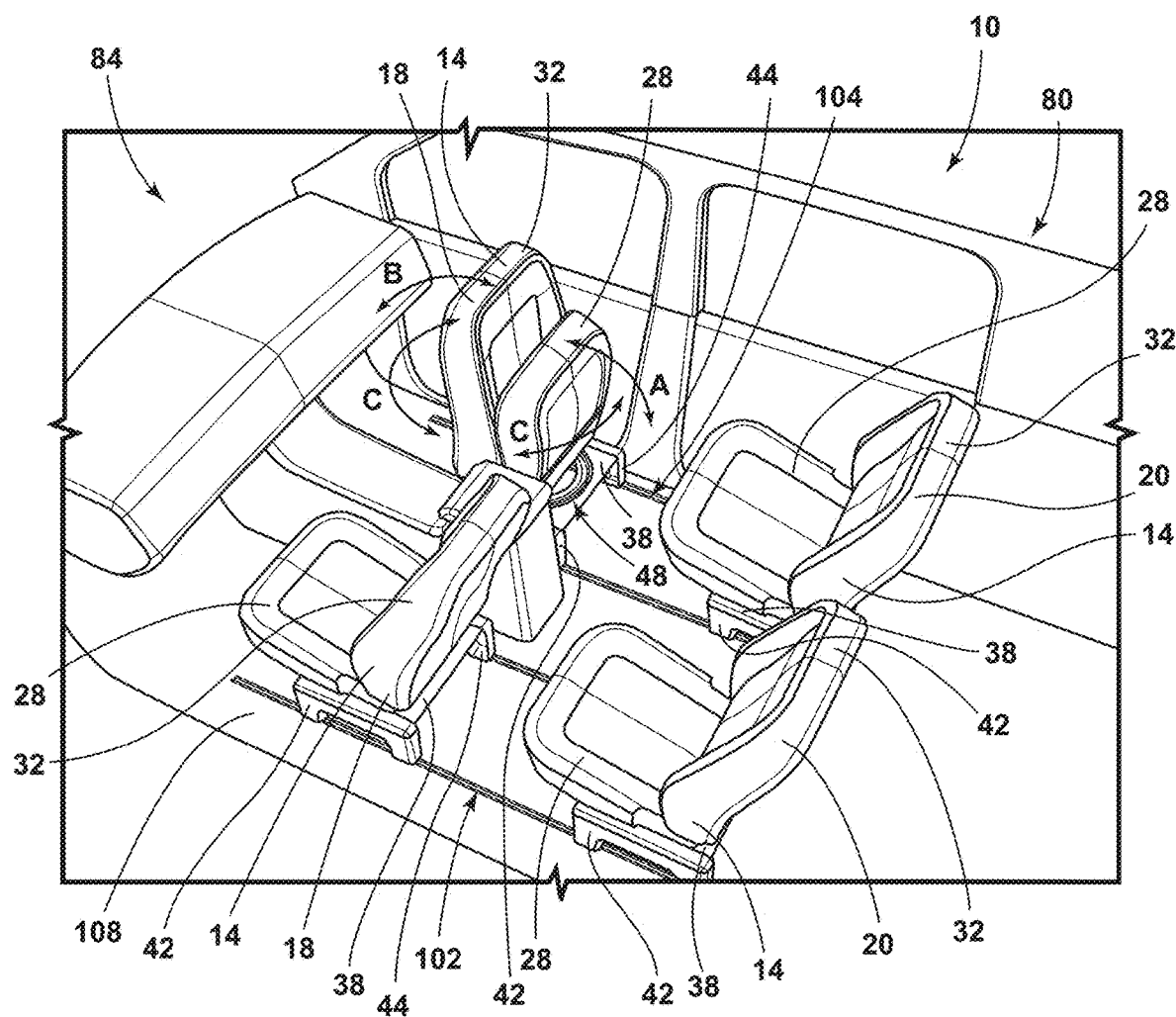
FIG. 5D is a top perspective view of the vehicle interior having the seating system of FIG. 1 with one of the seating assemblies of the seating system in a fifth position.

As shown in FIG. 5D, according to various examples, the seat base 28 may be movable between the second position and the first position along arrow A when the seating assembly 14 is positioned at one or more of the predetermined angles along the path indicated by arrows C. In other examples, the seat base 28 may be movable between the second position and the first position along arrow A when the seating assembly 14 is positioned in the forward position or in the rearward position. Similarly, in various examples, the seatback 32 may be movable between the upright and the reclined positions along arrow B when the seating assembly 14 is positioned at one or more of the predetermined angles along the path indicated by arrows C. In other examples, the seatback 32 may be movable between the upright position and the reclined position along arrow B when the seating assembly 14 is positioned in the forward position or in the rearward position.

Figure 6:
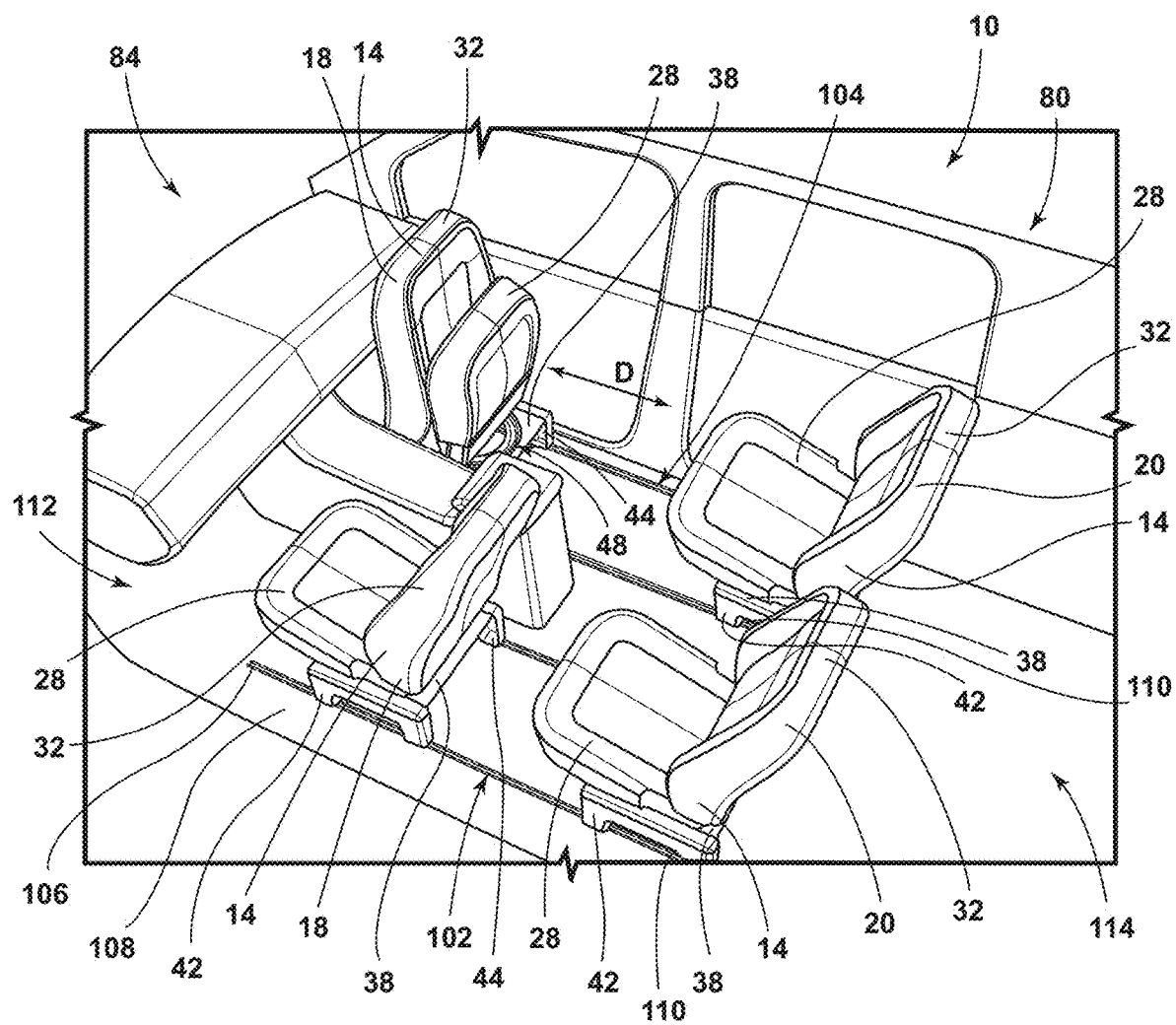
FIG. 6 is a top perspective view of the seating system and seating assembly of FIG. 1 with the seating assembly in the fifth position at a first end of a track assembly.
Figure 7:
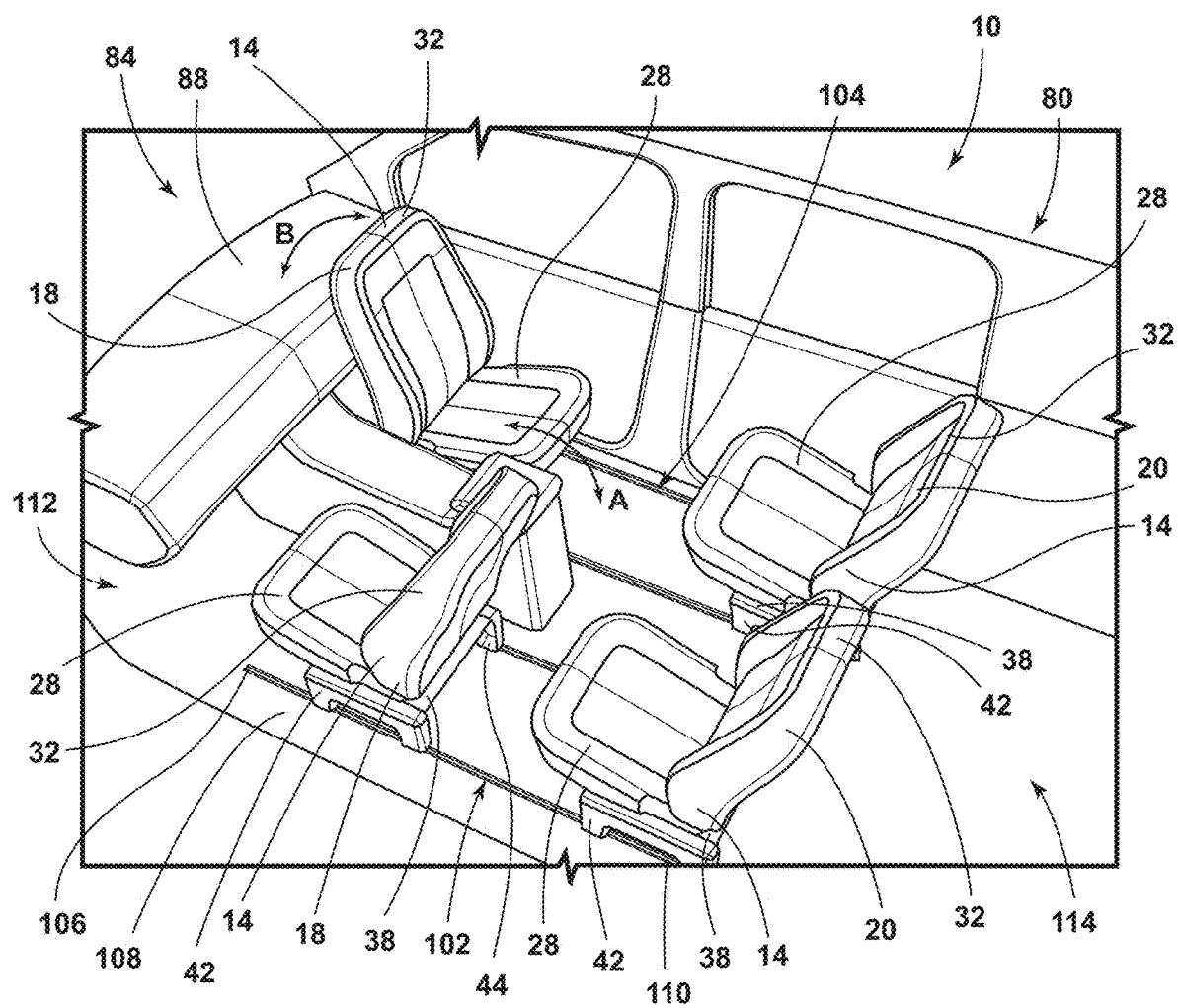
FIG. 7 is a top perspective view of the seating system of FIG. 1 with the seating assembly in a sixth position.

When the seating assembly 14 is in one of the forward position and the rearward position, the seating assembly 14 may be slideable along the track assembly 104 between a first sliding position (see FIGS. 1 and 5A-5D) and a second sliding position (FIGS. 6 and 7). Referring now to FIGS. 6 and 7, the front seating assembly 18 is movable along the path illustrated by arrow D from the first sliding position to the second sliding position. The first and second supports 42, 44 of the base 38 are slidably coupled to the track assembly 104 to facilitate fore and aft movement along the track assembly 104. The illustrated examples indicate the movement of a portion of the plurality of seating assemblies 14 along the second track assembly 104. However, it will be understood that the portion of the plurality of seating assemblies 14 positioned on the first track assembly 102 is similarly movable. It will also be understood that the seating assembly 14 may be stopped at any point on the track assembly 102, 104 between the first end 106 of the track assembly 104 positioned in the front portion 112 of the vehicle 84 and the second end 110 of the track assembly 104 positioned at the rear portion 114 of the vehicle 84. When the seating assembly 14 is at the first end 106 of the track assembly 104, the seatback 32 may abut the console 88 extending across the front portion 112 of the vehicle 84.

The seating assembly 14 may be translatable fore and aft along the track assembly 104 from the first end 106 to the second end 110, as described elsewhere herein, when the seat base 28 is in either of the first and second positions, when the seatback 32 is in either of the upright and reclined position, and when the seating assembly 14 is positioned at any angle relative to the forward position, including when the seating assembly 14 is in the forward position or the rearward position. As discussed elsewhere herein, the seat base 28 is movable between the first position and the second position, as shown in FIG. 7, and the seatback is movable between the reclined position and the upright position along the path illustrated by arrow B as shown in FIG. 7. The front seating assembly 18 may be positioned so that an occupant faces the rear seating assembly 20. Alternatively, the seat base 28 and the seatback 32 of the front seating assembly 18 may be positioned in the second position and the upright position, respectively, to provide additional space for the occupant of the rear seating assembly 20.

Figure 8:
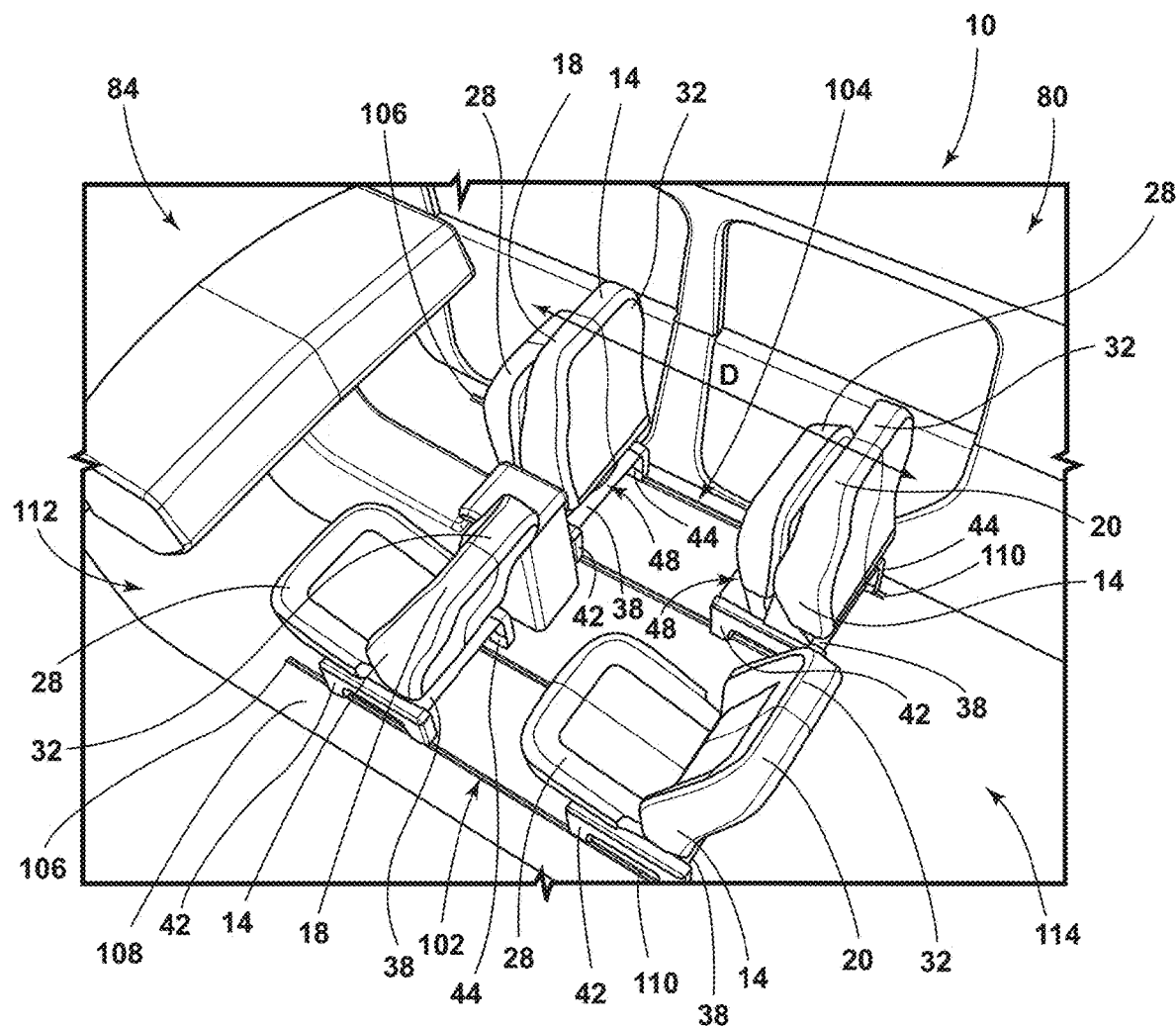
FIG. 8 is a top perspective view of the seating system of FIG. 1 with multiple seating assemblies in the second position.
Figure 9:
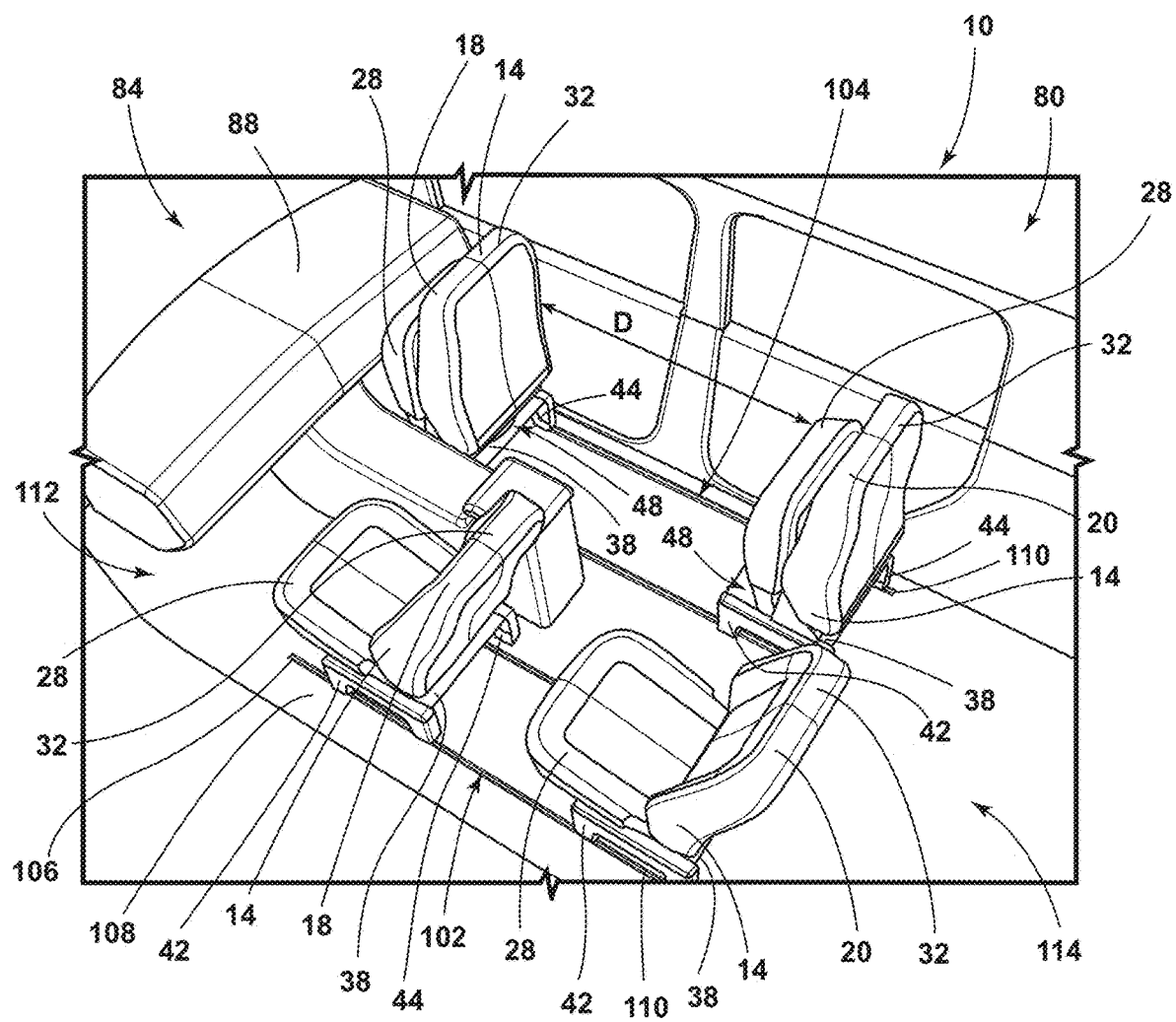
FIG. 9 is a top perspective view of the seating system of FIG. 1 with one of the seating assemblies in the second position at a first end of a track assembly and one of the seating assemblies in the second position at a second end of the track assembly.
Figure 10:
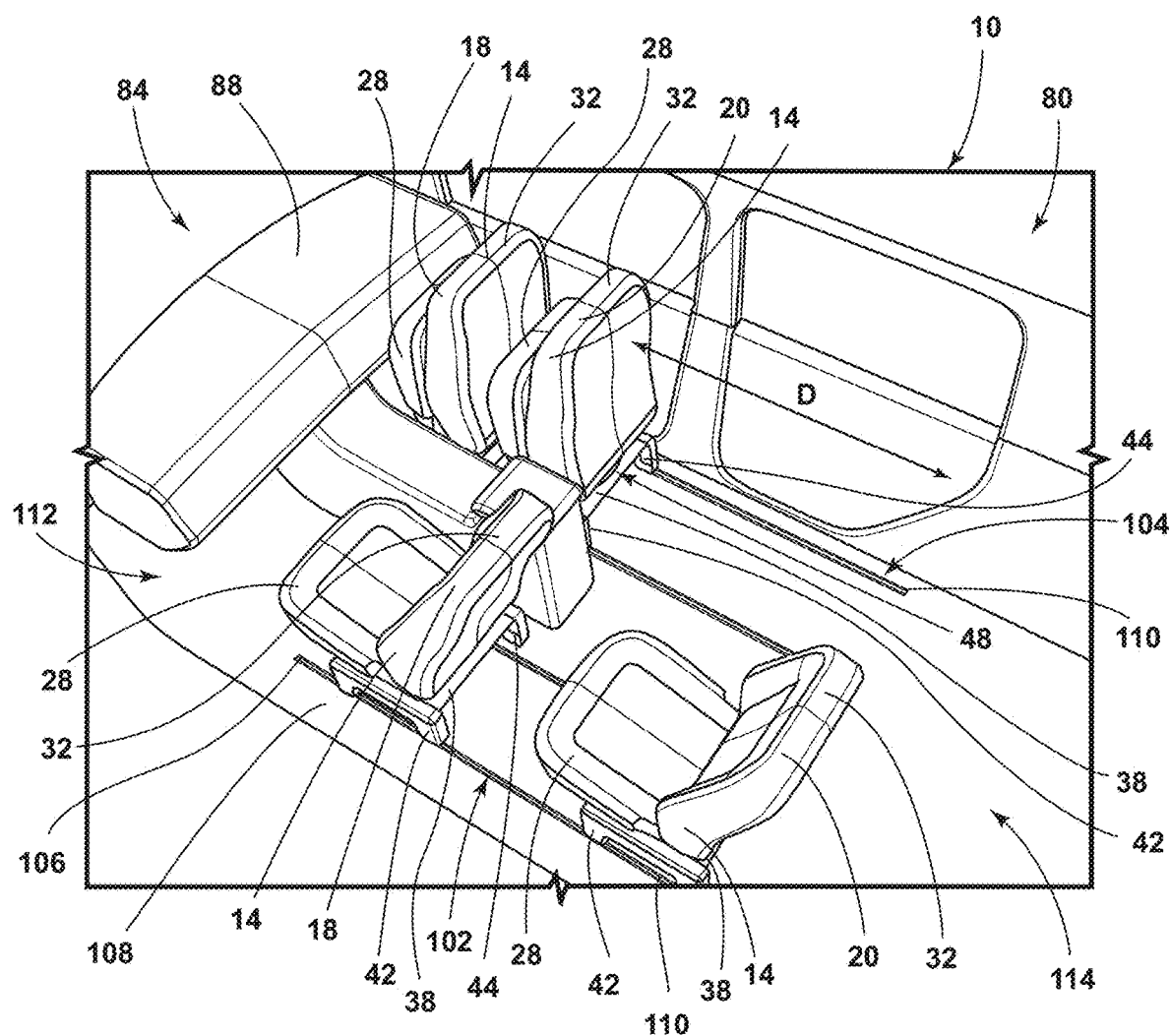
FIG. 10 is a top perspective view of the seating system of FIG. 1 with multiple seating assemblies in the second position at a first end of a track assembly.

Referring now to FIGS. 8-10, both the front seating assembly 18 and the rear seating assembly 20 may be positioned on the track assembly 104 in various positions. According to some examples, the front seating assembly 18 and the rear seating assembly 20 may have the respective seat bases 28 in the second position and the respective seatbacks 32 in the upright position. The front seating assembly 18 may be positioned on the track assembly 104 to abut the front console 88 of the vehicle, as previously discussed. In various examples, the front seating assembly 18 may be in the forward position so that the seat base 28 abuts, or is substantially flush with, the front console 88. In other examples, the front seating assembly 18 may be in the rearward position so that the seatback 32 abuts the front console 88. Similarly, the rear seating assembly 20 may be positioned on the track assembly to abut the front seating assembly 18. The rear seating assembly 20 may be positioned in the forward position or in the rearward position so that one of the seat base 28 and the seatback 32 of the rear seating assembly 20 abuts one of the seat base 28 and the seatback of the front seating assembly 18 and the base 38 of the rear seating assembly 20 is parallel and substantially flush with the base 38 of the front seating assembly 18, providing ample cargo room rearward of the seating assemblies 18, 20. It is also contemplated that the front and rear seating assemblies 18, 20 may be positioned at the second end 110 of the track assembly 104 to provide cargo room forward of the seating assemblies 18, 20 without departing from the scope of the present disclosure.

Figure 11:
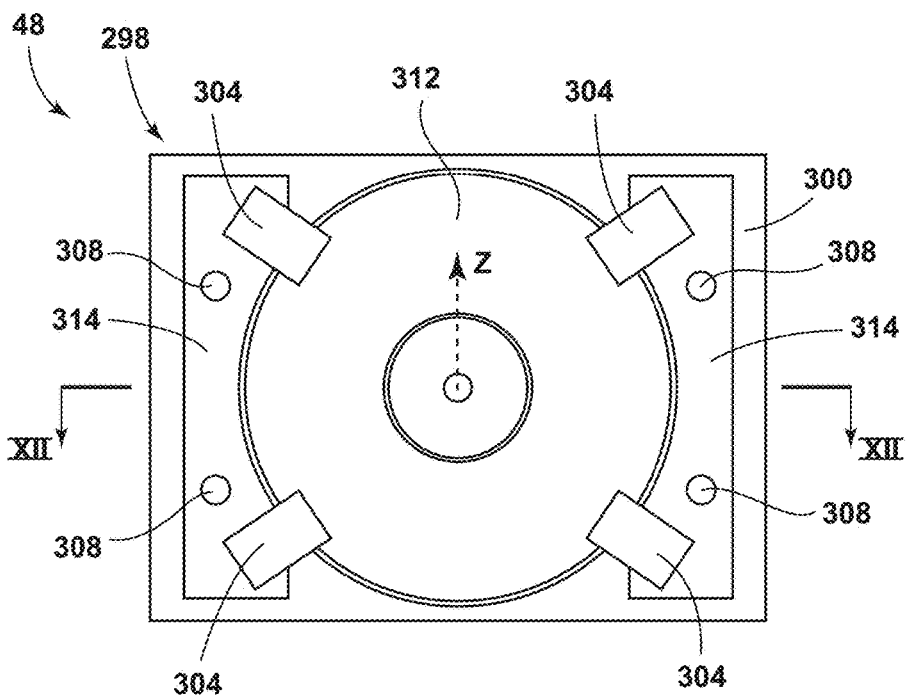
FIG. 11 is a top view of a swivel plate assembly according to some examples.

Referring now to FIGS. 11-15, the swivel assembly 48 is shown as an inset plate assembly 298, according to various examples. As shown in FIG. 11, the inset plate assembly 298 includes a primary plate 300, brackets 304, and a secondary plate 312.

Figure 12:
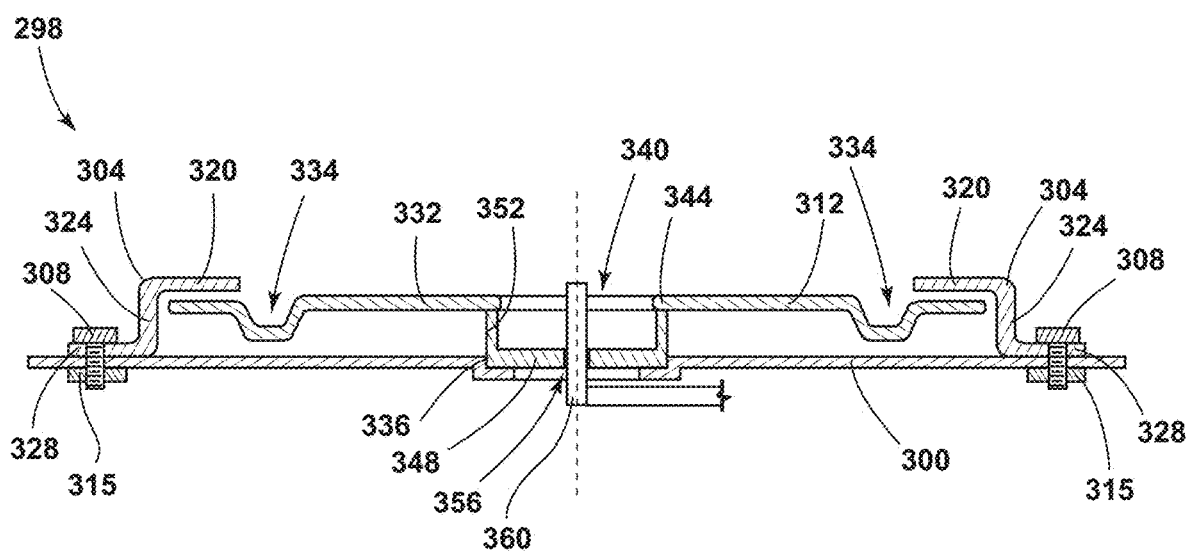
FIG. 12 is a cross-sectional view of the swivel plate assembly of FIG. 11 taken along line XII-XII according to some examples.
Figure 13:
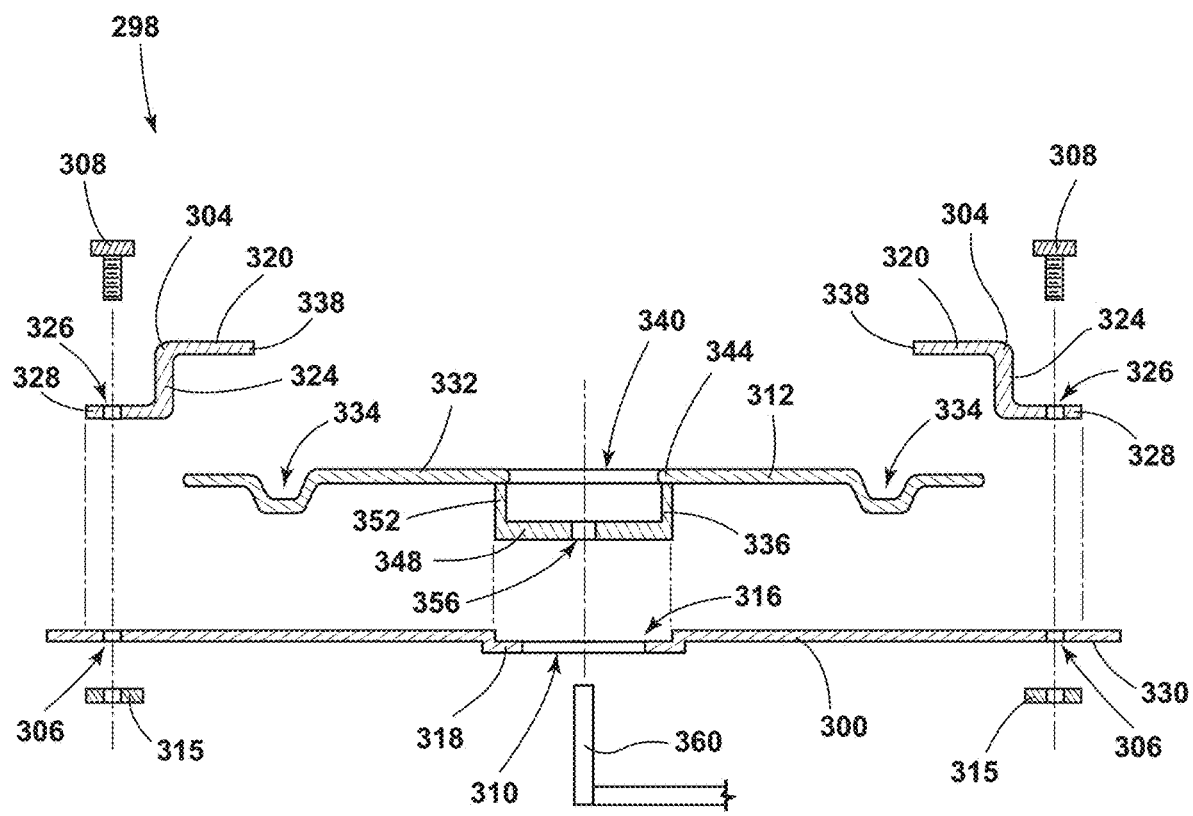
FIG. 13 is an exploded cross-sectional view of the swivel plate assembly of FIG. 11 taken along line XII-XII.

With reference again to FIG. 11, the primary plate 300 may be generally rectangular. In other examples, the primary plate 300 may be circular, trapezoidal, triangular, or any other shape without departing from the scope of the present disclosure. The primary plate 300 may be fixedly coupled to the base 38 of the seating assembly 14 (see FIG. 2A). As shown in FIGS. 12 and 13, in various examples, the primary plate 300 may define a plurality of receiving wells 306 configured to receive a fastener 308. The receiving wells 306 may be defined along lateral edges of the primary plate 300. Alternatively, the receiving wells 306 may be defined proximate the corners of the primary plate 300.

The primary plate may further define an opening 310 at the center point of the primary plate 300. The opening 310 may be of a predetermined size to at least partially receive the secondary plate 312. The opening 310 may be in communication with a receiving space 316. The opening 310 and the receiving space 316 may be at least partially defined by a receiving feature 318 extending downward from the primary plate 300. The opening 310 and the receiving space 316 may be generally circular. The opening 310 may have a small diameter than the receiving space 316.

As shown in FIGS. 11-13, at least one bracket 304 is positioned on the primary plate 300. According to some examples, the brackets 304 may be formed in pairs and joined by joining plates 314, as shown in FIG. 11. However, it will be understood that the brackets 304 may be individually fastened to the primary plate 300 in some examples, as shown in FIGS. 12 and 13. The brackets 304 may be positioned at various predetermined angles as measured circumferentially from a datum Z of the secondary plate 312. For example, the brackets may be positioned at 45 degrees, 135 degrees, 225 degrees, and 315 degrees.

Referring again to FIGS. 12 and 13, each bracket includes a top portion 320, a side portion 324, and a base portion 328. The top portion 320, side portion 324, and base portion 328 may be integrally formed. According to various examples, the top portion 320, the side portion 324, and the base portion 328 are linear. The top portion 320 may be positioned perpendicular to the side portion 324. Similarly, the side portion 324 is positioned perpendicular to the base portion 328. In other examples, the top portion 320 may be non-linear and configured to curve over the secondary plate 312 to couple the secondary plate 312 to the primary plate 300.

The base portion 328 of each bracket 304 may define a receiving well 326 configured to align with the receiving wells 306 of the primary plate 300. The receiving wells 306, 326 are configured to receive the fasteners 308 to secure the respective bracket 304 to the primary plate 300. In various examples, the fasteners 308 may include bolts 315 secured against a bottom surface 330 of the primary plate 300. Alternatively, the fasteners 308 may be pins, screws, or any other securing feature without departing for scope of the present disclosure.

Referring again to FIGS. 11-13, the secondary plate 312 is generally circular and includes a first portion 332 and a second portion 336. The first portion 332 is generally circular and defines an opening 340. A rim 344 at least partially defines the opening 340. The opening 340 is defined in the center of the secondary plate 312 and is configured to align with the opening 310 of the receiving feature 318 of the primary plate 300. The first portion 332 further defines a groove 334 positioned circumferentially about the first portion 332. According to various examples, the groove 334 is configured to receive a first end 338 of the top portion 320 of each of the brackets 304.

The second portion 336 of the secondary plate 312 is generally cylindrical and includes a bottom surface 348 and a wall 352. The wall 352 extends downward from the rim 344 of the first portion 332 and is coupled to the bottom surface 348. The bottom surface 348 defines an aperture 356 positioned to align with the openings 310, 340 when the second portion 336 of the secondary plate 312 is received by the receiving feature 318. When the second portion 336 of the secondary plate 312 is received by the receiving feature 318, the receiving feature 318 guides the position of the secondary plate 312 as it rotates relative to the primary plate 300.

The openings 310, 340 and the aperture 356 are configured to receive a shaft 360 extending upward through the inset plate assembly 298. The shaft 360 is configured to rotate the secondary plate 312 about a center axis defined through the shaft 360, the aperture 356, and the openings 310, 340 of the inset plate assembly 298. The shaft 360 may be operably coupled to a motor according to various examples. In other examples, the shaft 360 may be coupled to a manual swivel mechanism operable by a user.

According to various examples, a lubricant may be applied where the brackets 304 contact the secondary plate 312. The lubricant may be applied to the first portion 332 of the secondary plate 312 and may be applied within the groove 334 to facilitate movement of the secondary plate 312. Similarly, the lubricant may be applied where the bottom surface 348 of the secondary plate 312 abuts the receiving feature 318 of the primary plate 300. The lubricant may also be used where the shaft 360 is received by the aperture 356 of the secondary plate 312. In other examples, a lubricant layer 424 may be embedded between the secondary plate 312 and the primary plate 300 to eliminate the need for lubricant at various contact points between the secondary plate 312 and the primary plate 300 (see FIG. 15).

Figure 14:
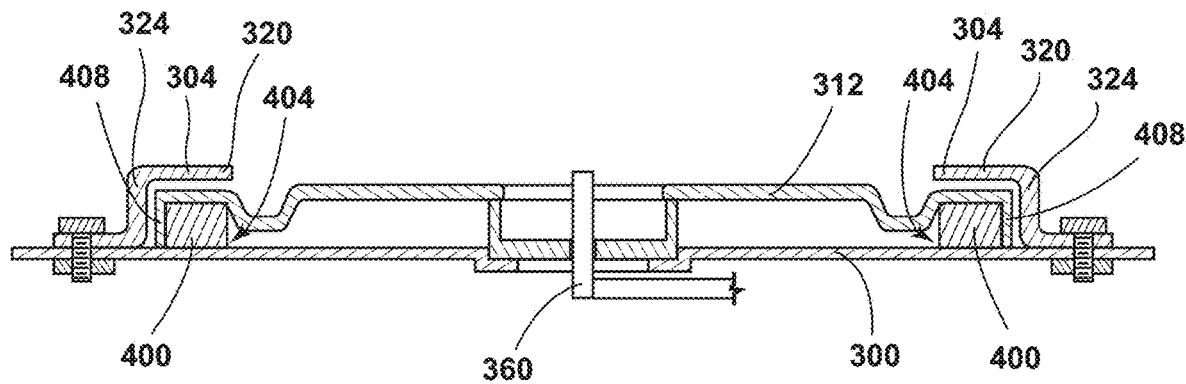
FIG. 14 is a cross-sectional view of the swivel plate assembly of FIG. 11 taken along line XII-XII according to some examples.

Referring now to FIG. 14, according to various examples, a rotation feature 400 may be positioned between the primary plate 300 and the secondary plate 312. The rotation feature 400 may be, for example, a smaller lubricant layer, a roller ball assembly, a brush, or a plurality of bearings. According to various examples, the secondary plate 312 may include an outer wall 408 configured to be substantially flush with the side portion 324 of each bracket 304. The outer wall 408 and the first portion 332 of the secondary plate 312 may at least partially define a cavity 404 configured to house the rotation feature 400. The cavity 404 may be configured to house the rotation feature 400, the lubricant layer 424, or any other feature configured to facilitate low friction rotation of the secondary plate 312 relative to the primary plate 300.

Figure 15:
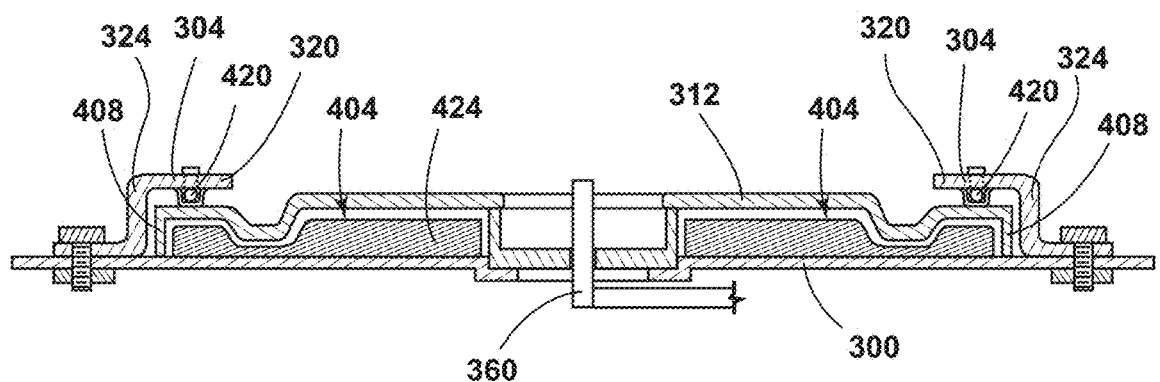
FIG. 15 is a cross-sectional view of the swivel plate assembly of FIG. 11 taken along line XII-XII according to some examples.

Referring now to FIG. 15, ball bearings 420 may be positioned between the top portion 320 of each bracket 304 and the secondary plate 312 to allow the secondary plate 312 to rotate relative to the primary plate 300 with low friction. It will be understood that any combination of bearings, roller ball assemblies, lubricant, and a lubricant layer may be used together to facilitate low friction rotation of the secondary plate 312 relative to the primary plate 300.

Figure 16:
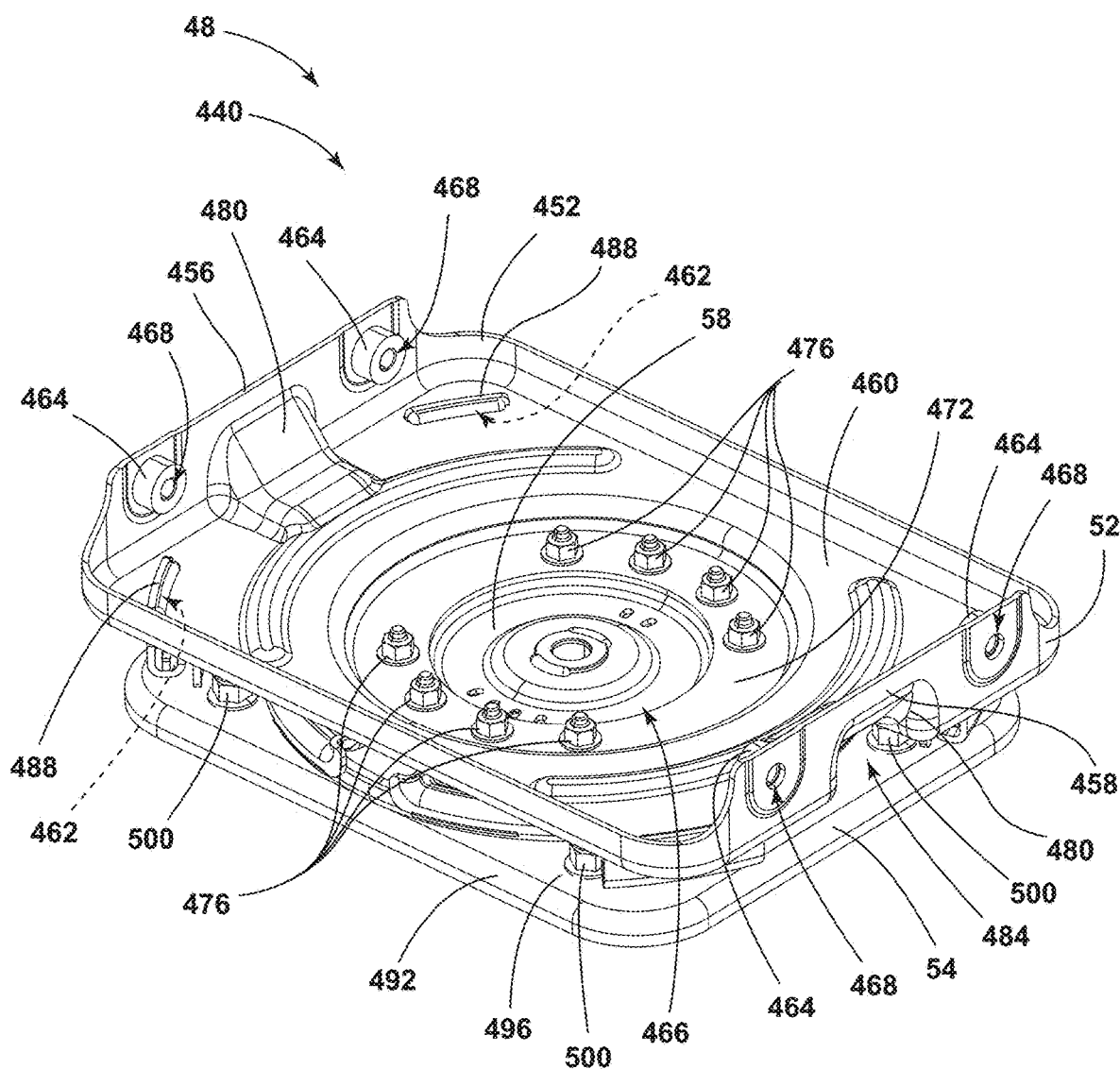
FIG. 16 is a top perspective view of a swivel plate assembly according to some examples.

Referring now to FIG. 16, the swivel plate assembly 48 is shown as a dual plate assembly 440 according to various examples. The dual plate assembly 440 includes the first and second frames 52, 54. The first frame 52 is configured to be operably coupled to the cradle 24 of the seating assembly 14 and the second frame 54 is operably coupled to the base 38 of the seating assembly 14, as discussed elsewhere herein with reference to FIGS. 2A and 2B. The first frame 52 is generally rectangular. However, the first frame 52 may be any shape configured to mirror the cross-sectional shape of the cradle 24. Similarly, the second frame 54 may be generally rectangular. However, the second frame 54 may be any shape configured to mirror the shape of the base 38.

Figure 17:
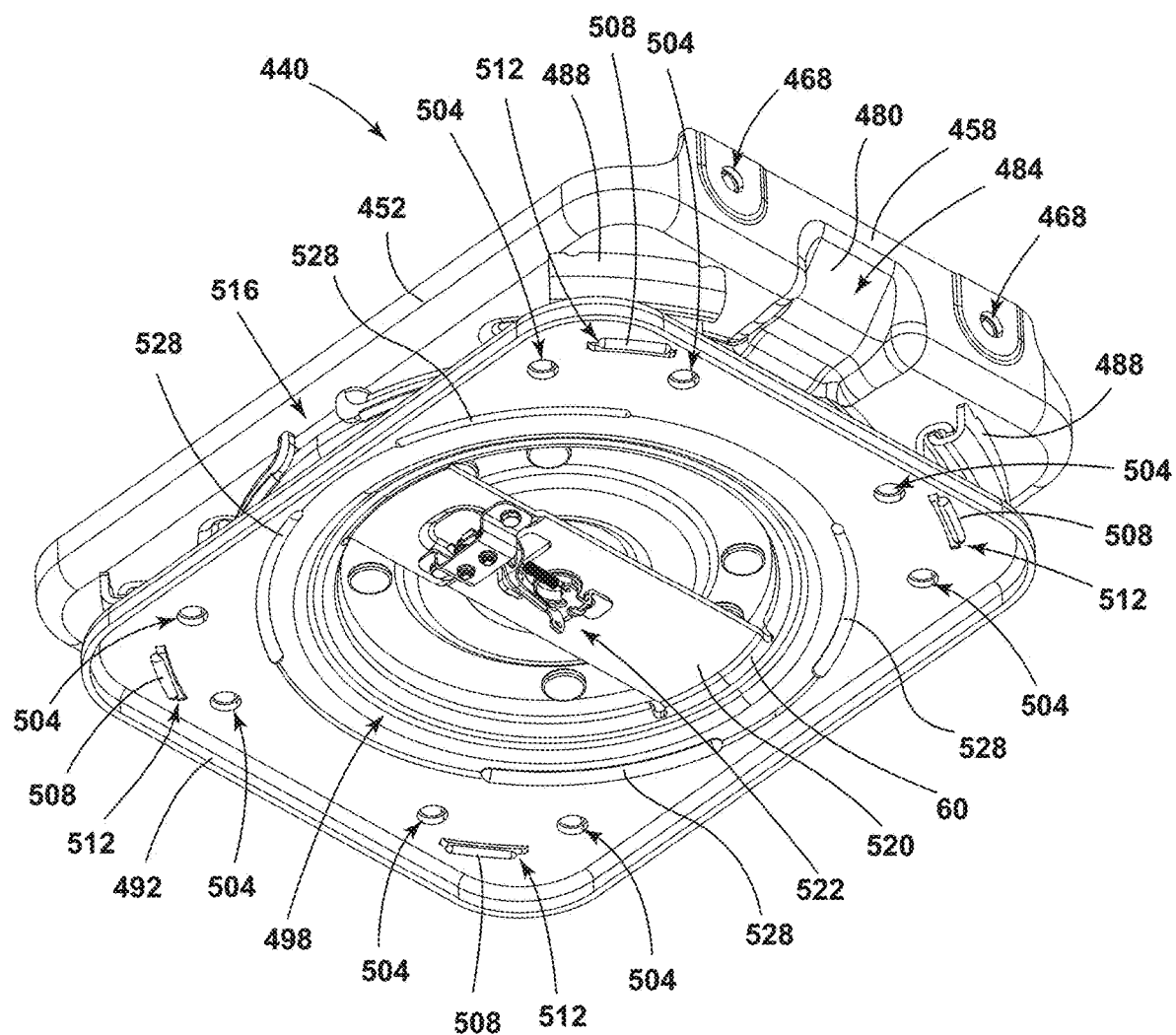
FIG. 17 is a bottom perspective view of the swivel plate assembly of FIG. 16.
Figure 18:
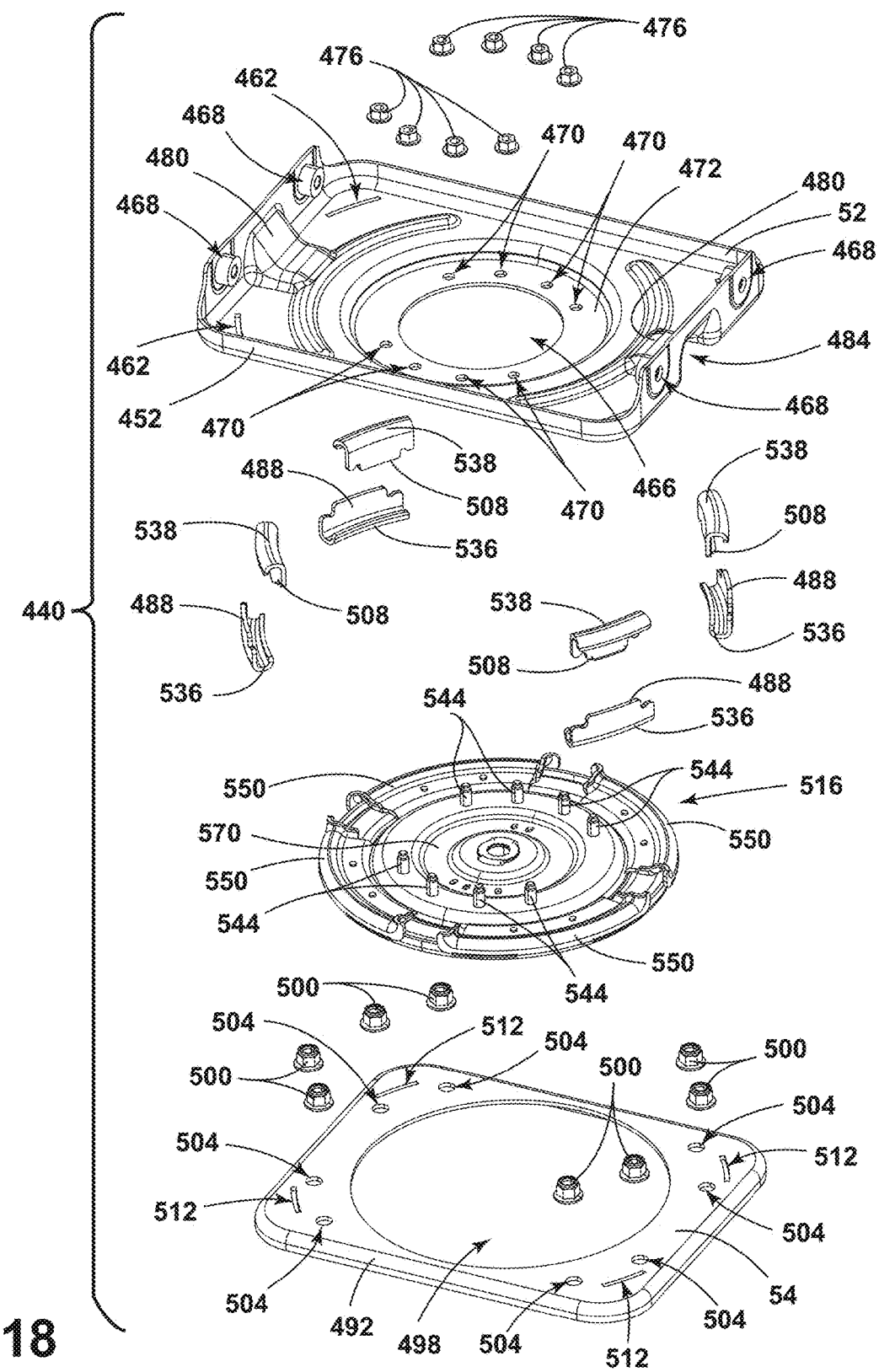
FIG. 18 is an exploded view of the swivel plate assembly of FIG. 16.

As shown in FIGS. 16-18, the first frame 52 includes a rim 452 surrounding the first frame 52 and integrally formed with first and second side walls 456, 458 of the first frame 52. Each of the first and second side walls 456, 458 and the rim 452 are joined by a central surface 460 of the first frame 52. The central surface 460 defines a plurality of slots 462 positioned proximate the corners of the first frame 52. The central surface 460 may further define an opening 466 configured to be aligned with a first swivel plate 58.

The central surface 460 includes an inner surface 472 configured to be positioned substantially flush with a portion of the first swivel plate 58 when the dual plate assembly 440 is assembled. The inner surface 472 defines a plurality of receiving wells 470. The receiving wells 470 are configured to receive a plurality of fasteners 544 of the first swivel plate 58. According to various examples, the fasteners 544 may be secured with bolts 476. The bolts 476 selected may be of a predetermined thickness selected to be less than the height of the rim 452 of the first frame 52. In other examples, the inner surface 472 may be positioned lower than the central surface 460 to recess the bolts 476 below the rim 452 of the first frame 52. As shown in FIGS. 16 and 18, the receiving wells 470 may be arranged in two groups according to various examples. However, it will be understood that the plurality of receiving wells 470 may be evenly spaced circumferentially about the inner surface 472 without departing from the scope of the present disclosure.

Each of the first and second side walls 456, 458 of the first frame 52 includes a plurality of engagement protrusions 464 defining a plurality of engagement spaces 468. The plurality of engagement protrusions 464 and the plurality of engagement spaces 468 are configured to facilitate coupling the first frame 52 with the cradle 24 or the seat base 28 of the seating assembly 14 (see FIGS. 1-2B). Each of the first and second side walls 456, 458 may each include a handle 480 positioned to define a cavity 484. The handle 480 and the cavity 484 may be utilized by the occupant to control the rotation of the first frame 52 relative to the second frame 54.

As shown in FIGS. 16-18, the second frame 54 includes a rim 492 surrounding a second central surface 496. The second central surface 496 of the second frame 54 defines a plurality of attachment apertures 504. The attachment apertures 504 are configured to facilitate coupling the second frame 54 to the base 38. Bolts 500 may be used to further facilitate coupling the second frame 54 to the base 38. The second central surface 496 of the second frame 54 further defines a plurality of slots 512 positioned proximate the corners of the second frame 54. The second central surface 496 may further define an opening 498 configured to at least partially receive the second swivel plate 60. The second swivel plate 60 may be cushioned against the second frame 54 using buffers 528 positioned circumferentially about the second swivel plate 60 and partially received by the opening 498 of the second frame 54. It is contemplated that the buffers 528 may be configured as a single continuous buffer 528 or may be removed entirely and replaced with other rotation facilitating materials. The opening 498 of the second frame 54 may further partially receive a locking assembly 522 positioned on and extending from a cross portion 520 of the second swivel plate 60.

Referring now to FIG. 18, the first swivel plate 58, the second swivel plate 60, and a plurality of brackets 550 form a rotation assembly 516 positioned between the first and second frames 52, 54. The fasteners 544 may be fixably coupled to the first swivel plate 58 so that the first frame 52 is fixedly coupled to the first swivel plate 58.

Upper J-hooks 536 are operably coupled to the first frame 52. Each of the upper J-hooks 536 includes a first end 488 configured to be received by one of the plurality of slots 462 defined by the central surface 460 of the first frame 52. Similarly, lower J-hooks 538 are operably coupled to the second frame 54. Each of the lower J-hooks 538 includes a first end 508 configured to be received by one of the plurality of slots 512 defined by the second frame 54. The upper and lower J-hooks 536, 538 are operably coupled to secure the first frame 52 to the second frame 54. When the J-hooks 536, 538 are operably coupled, the rotation assembly 516 including the first swivel plate 58, the second swivel plate, 60, and the plurality of brackets 550 is positioned and secured between the first and second frames 52, 54. The upper and lower J-hooks 536, 538 are rotatable relative to one another, further facilitating rotation of the first frame 52 relative to the second frame 54.

Figure 19:
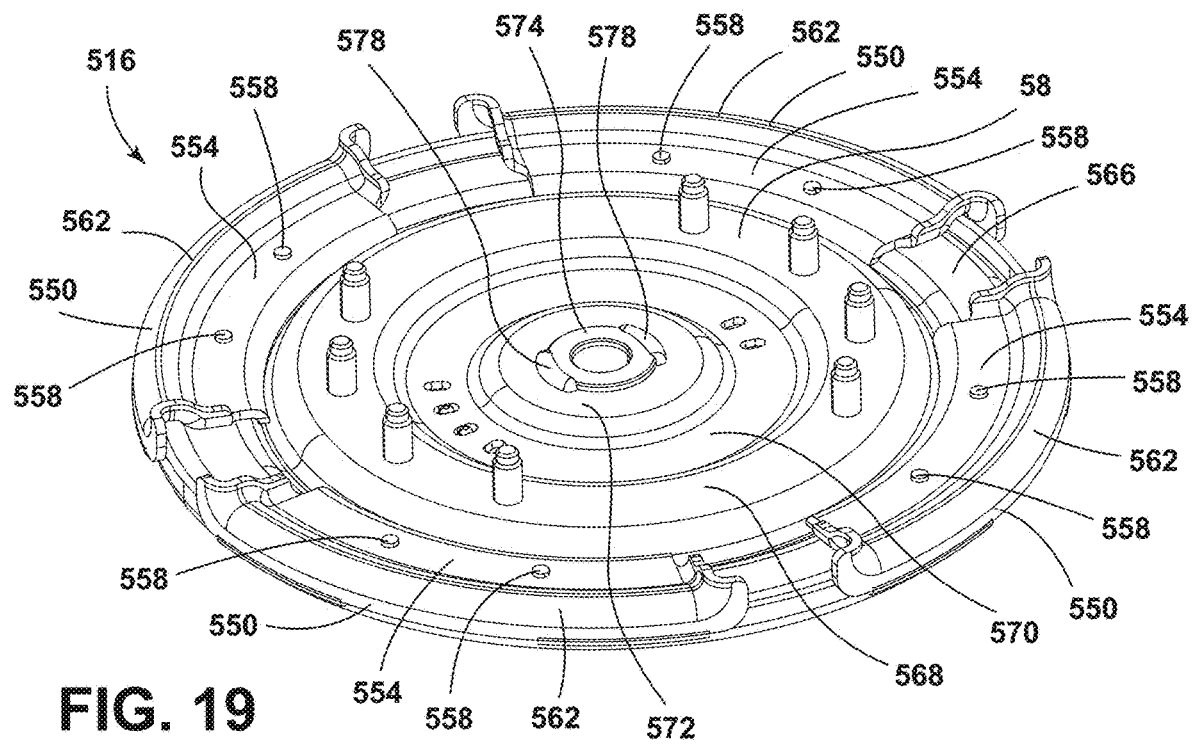
FIG. 19 is a top profile view of a swivel plate assembly according to some examples.
Figure 20:
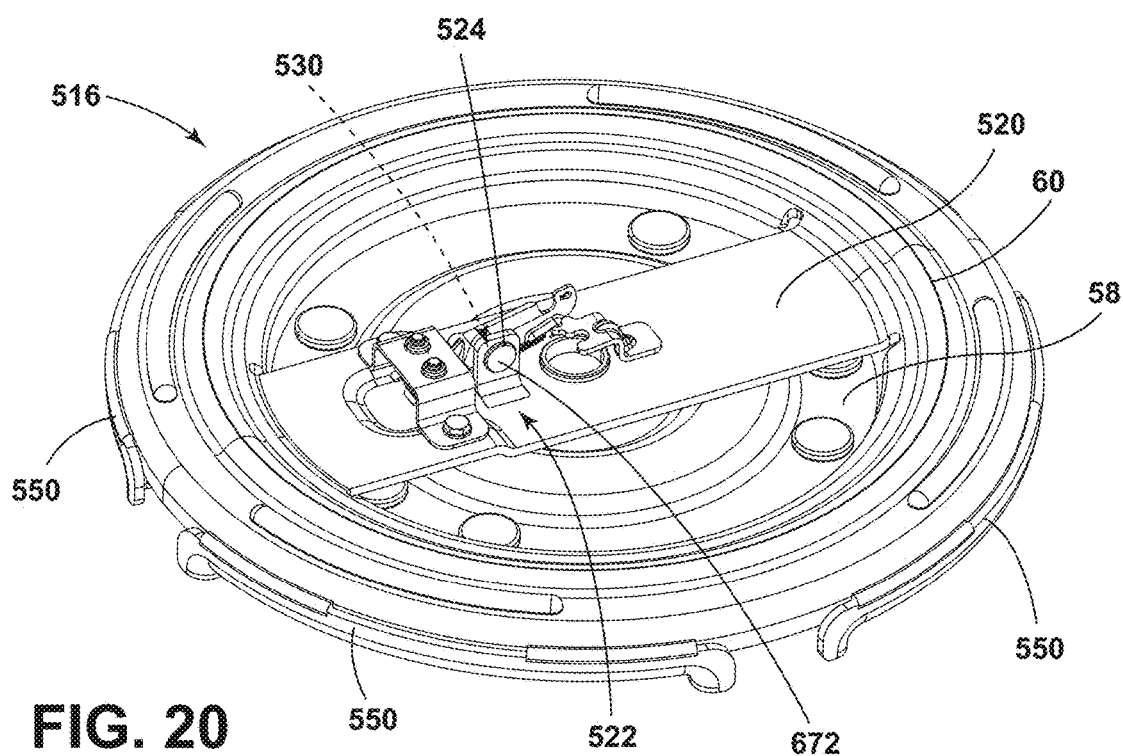
FIG. 20 is a bottom perspective view of swivel plates of the swivel plate assembly of FIG. 16.
Figure 21:
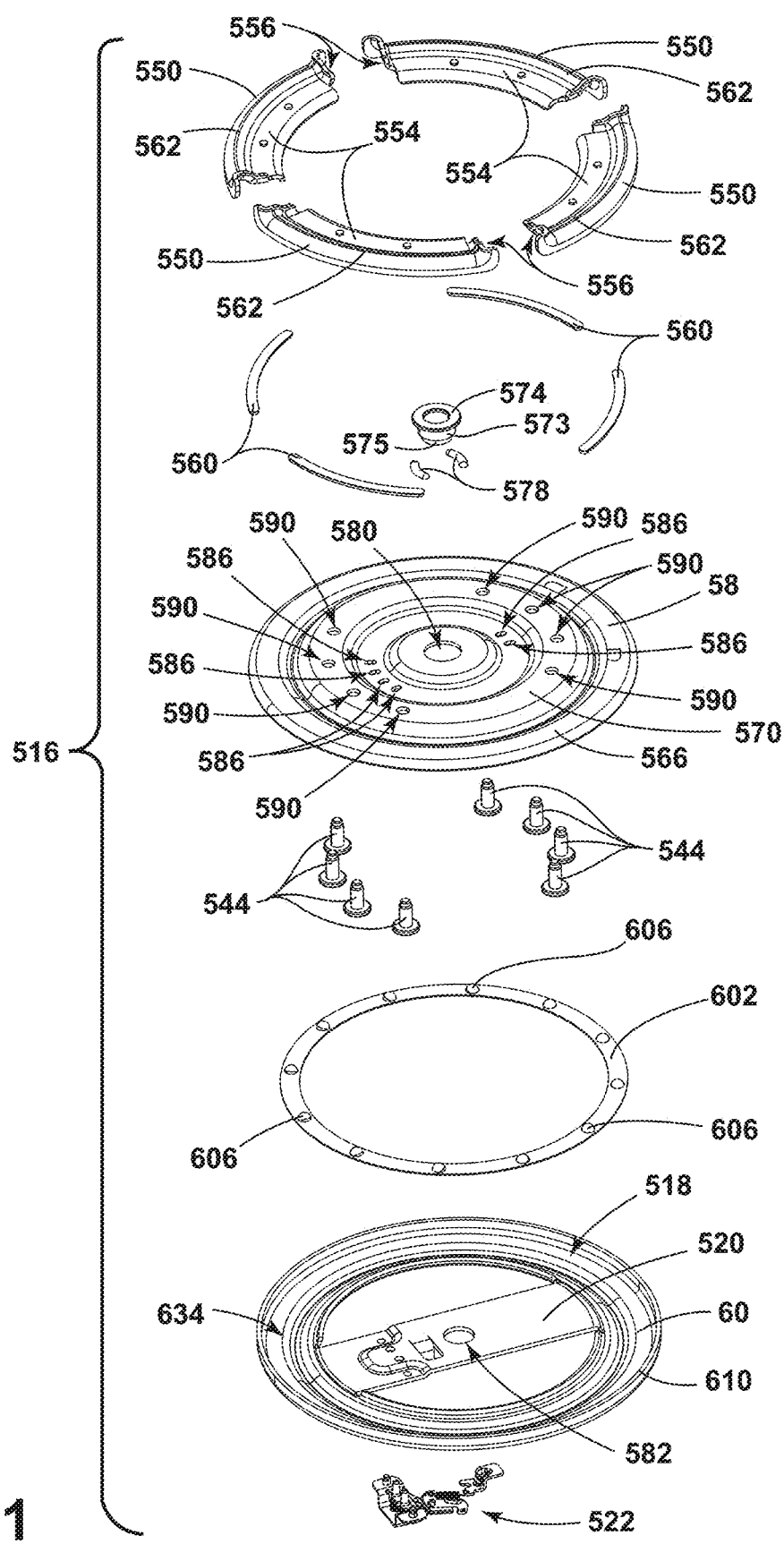
FIG. 21 is an exploded view of the swivel plates of FIG. 19.

Referring now to FIGS. 19-21, the rotation assembly 516 is shown having the first swivel plate 58 and the second swivel plate 60. The first and second swivel plates 58, 60 are operably coupled by the plurality of brackets 550 with the first swivel plate 58 positioned substantially flush with the second swivel plate 60. The second swivel plate 60 includes the cross portion 520, as discussed elsewhere herein. The locking assembly 522 may be positioned on the cross portion 520 of the second swivel plate 60.

The plurality of brackets 550 is positioned circumferentially around the rotation assembly 516. The brackets 550 may be evenly spaces around the rotation assembly 516. Alternatively, the brackets 550 may be unevenly spaced. Each of the plurality of brackets 550 has a first portion 554 and a second portion 562. The first portion 554 of each bracket 550 includes retaining fixtures 558 configured to couple rotation members 560 to the underside of the first portion 554. According to various examples, the rotation members 560 may be low friction plastic pads. The low friction plastic pads may be made of a low friction pad, for example, Acetyl. In other examples, the rotation members 560 may be rollers, bearings, lubricated buffers, or any other feature to facilitate low friction rotation of the first swivel plate 58 relative to the second swivel plate 60.

The second portion 562 of each of the plurality of brackets 550 is raised and defines a channel 556. The channel 556 is configured to receive a portion of the second swivel plate 60 and guide the rotation of the second swivel plate 60 relative to the first swivel plate 58. The second portion 562 of each swivel plate is configured to fit over a rim 610 of the second swivel plate 60 to couple the first swivel plate 58 to the second swivel plate 60.

The first swivel plate includes an outer rim portion 566 configured to be covered by the first and second portions 554, 562 of the bracket 550. The outer rim portion 566 is integrally formed with and circumferentially surrounds an inner rim portion 568. The inner rim portion 568 defines apertures 590 configured to receive the fasteners 544 configured to couple the rotation assembly 516 to the second frame, as discussed elsewhere herein. The inner rim portion 568 circumferentially surrounds and is integrally formed with a first center portion 570. It is contemplated that the outer rim portion 566 and the inner rim portion 568 may be a single portion of the first swivel plate 58 according to various examples.

According to various examples, the first center portion 570 may be positioned so that the surface of the first center portion 570 is lower than the surface of the inner rim portion 568. The first center portion defines a plurality of pairs of engagement slots 586. Each pair of engagement slots 586 is spaced apart by a center wall 588 having a predetermined width W1 (see FIG. 22). The plurality of pairs of engagement slots 586 may be evenly spaced circumferentially about the first center portion 570. Alternatively, each of the plurality of pairs of engagement slots 586 may be positioned at predetermined spacing to provide one or more locking positions for the first swivel plate 58 relative to the second swivel plate 60. It will be understood that any the pattern and spacing for the plurality of pairs of engagement slots 586 may be used to provide any number of locking positions at various angles (see FIGS. 5A-5D) without departing from the scope of the present disclosure. In some examples, the center wall 588 may be shared by two of the plurality of pairs of engagement slots 586. For example, three engagement slots 586 with two center walls 588 may be two pairs of engagement slots 586.

The first center portion 570 circumferentially surrounds a second center portion 572. According to various examples, the second center portion 572 may be raised from the first center portion 570. In other examples, the second center portion 572 may be positioned to be even with the first center portion 570. The second center portion defines the space 580 for receiving the center bushing 574. The space 580 may be generally circular and is positioned at the center point of the first swivel plate 58.

The center bushing 574 is received by the first space 580 defined by the first swivel plate 58. The center bushing 574 extends through the first swivel plate 58 and is received by a second space 582 defined by the second swivel plate 60. The center bushing 574 may include a first body portion 573 configured to be received by the first space 580 of the first swivel plate 58. According to various examples, the second space 582 of the second swivel plate 60 may have a diameter that is less than the diameter of the first space 580. Where the diameter of the second space 582 is less than the diameter of the first space 580, the center bushing 574 may further include a second body portion 575 configured to be received by the second space 582. The second body portion 575 has a diameter that is less than the first body portion 573. The diameters of the first and second body portions 573, 575 are configured to complement the diameters of the first and second spaces 580, 582, respectively. The center bushing 574 may be cushioned by buffers 578 positioned around the circumference of the center bushing 574. The buffers 578 may be evenly spaced around the center bushing 574. Alternatively, the center bushing 574 may be cushioned by a single buffer 578 extending the entirety of the circumference of the center bushing 574. The center bushing 574 is configured to at least partially guide the rotation of the first swivel plate 58 relative to the second swivel plate 60. The center bushing 574 may further at least partially couple the first swivel plate 58 to the second swivel plate 60.

As discussed previously, the first swivel plate 58 is rotatably coupled to the second swivel plate 60 by the plurality of brackets 550 and the center bushing 574. The second swivel plate 60 includes a rim 610 where the rim and the swivel plate 60 define a cavity 518. The cavity 518 is configured to receive the first swivel plate 58. A ball bearing ring 602 is secured between the first swivel plate 58 and the second swivel plate 60 and configured to facilitate low friction rotation of the first swivel plate 58 relative to the second swivel plate 60. The ball bearing ring 602 includes a plurality of ball bearings 606 configured to at least partially abut the first swivel plate 58 and the second swivel plate 60, as discussed elsewhere herein.

The second swivel plate 60 includes the cross portion 520 configured at least partially support the first swivel plate 58 through the coupling of the first swivel plate 58 to the second swivel plate 60 by the center bushing 574. The cross portion 520 may define the second space 582 for receiving the center bushing 574. The cross portion 520 is further coupled to and configured to support the locking assembly 522, as discussed elsewhere herein. As shown in FIG. 20, a locking support 524 extends away from the cross portion 520 of the second swivel plate 60. The locking support 524 defines an aperture 530 configured to receive a support pin 672 for the locking assembly 522, as discussed elsewhere herein.

Figure 22:
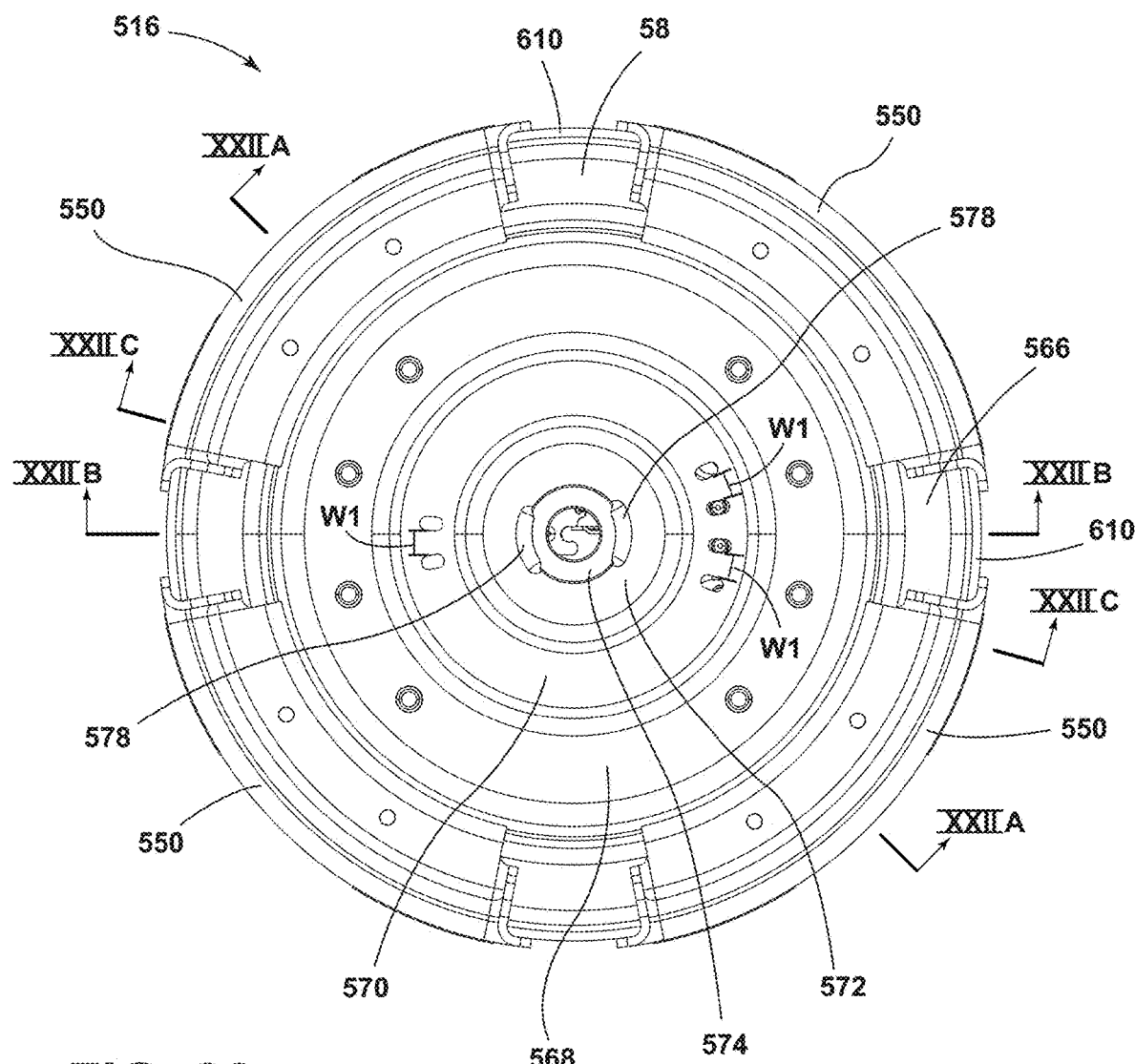
FIG. 22 is a top profile view of the swivel plates of FIG. 19.
Figure 22A:
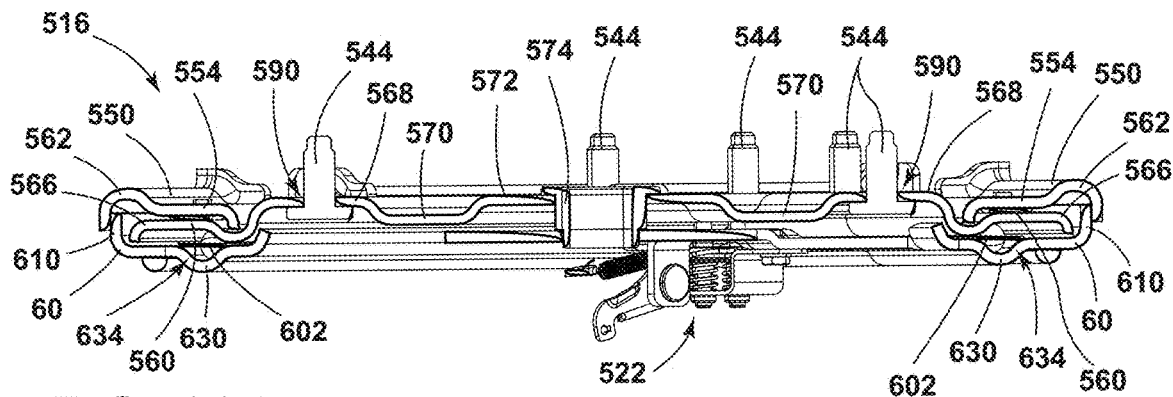
FIG. 22A is a cross-sectional view of the swivel plates of FIG. 22 taken along line XXIIIA-XXIIA.
Figure 22B:
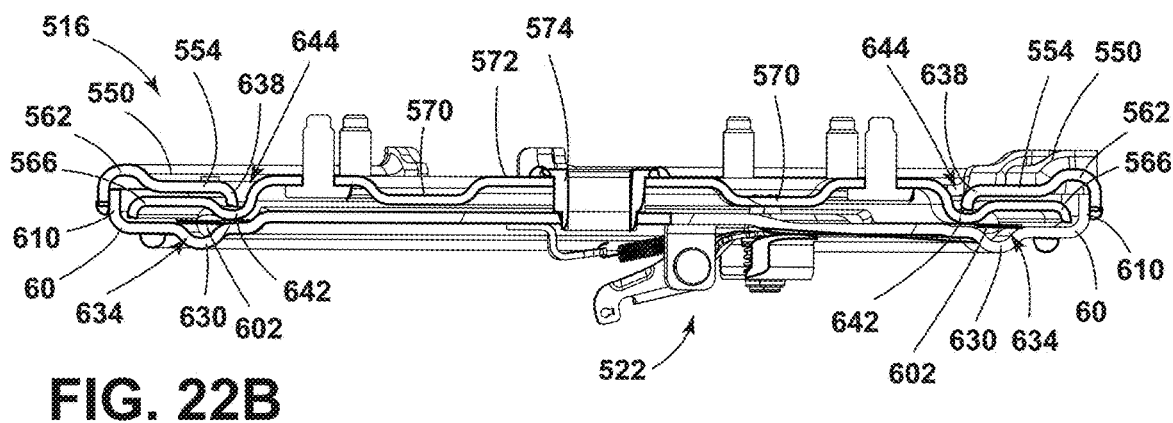
FIG. 22B is a cross-sectional view of the swivel plates of FIG. 22 taken along line XXIIIB-XXIIB.
Figure 22C:
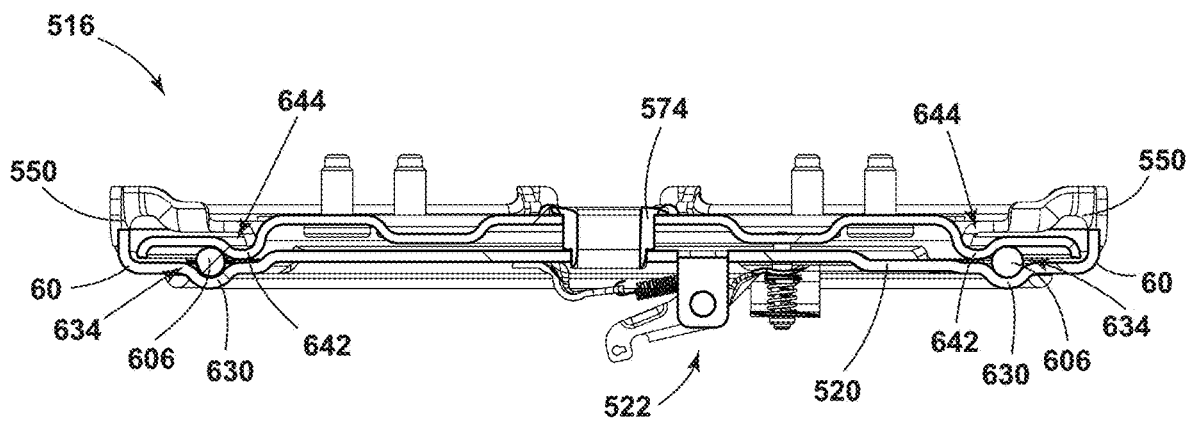
FIG. 22C is a cross-sectional view of the swivel plates of FIG. 22 taken along line XXIIIC-XXIIC.

Referring now to FIGS. 22-22C, the interaction between the brackets 550, the first swivel plate 58, and the second swivel plate 60 vary circumferentially. As shown in FIG. 22A, the second portion 562 of each of the brackets 550 may be positioned substantially flush with the rim 610 of the second swivel plate 60. According to various examples, the second portion 562 of each of the brackets 550 may be coupled to the rim 610 of the second swivel plate 60. The second portion 562 may be coupled to the rim 610 using, for example, welding, fasteners, or clips. When the second portion 562 is coupled with the rim 610, the rotation members 560 may be secured between the outer rim 566 of the first swivel plate 58 and the first portion 554 of each of the brackets 550.

The second swivel plate 60 may define a first groove 630 extending circumferentially about the second swivel plate 60 and in communication with the cavity 518 defined by the second swivel plate 60. The outer rim 566 of the first swivel plate 58 and the first groove 630 of the second swivel plate 60 define a channel 634 configured to receive the ball bearing ring 602. The size of the channel 634 is selected to complement the diameter of the ball bearings 606 so that each ball bearing 606 is at least partially in contact with the first swivel plate 58 and the second swivel plate 60.

The channel 634 may be further at least partially defined by a middle rim portion 642 of the first swivel plate 58. The middle rim portion 642 may be positioned between the outer rim 566 and the inner rim 568 and defines a second groove 644. The second groove 644 has a generally semicircular cross-section, according to various examples. However, it is contemplated that the channel 634 may have a cross-section of any shape without departing from the scope of the present disclosure. The channel 634 is configured to receive an end 638 of the first portion 554 of each of the brackets 550 to further couple the first swivel plate 58 to the second swivel plate 60. A retaining end 638 extends upward from the second swivel plate 60 on the opposite side of the middle rim portion 642 from the end 638 of the first portion 554 of the bracket 550. The end 638 of the bracket 550 and the retaining end 638 of the second swivel plate 60 act as retaining features for the first swivel plate 58 as the first swivel plate 58 rotates relative to the second swivel plate 60. The end 638 may be integrally formed with the cross portion 520 to provide added support for the first swivel plate 58 and the locking assembly 522.

Figure 23:
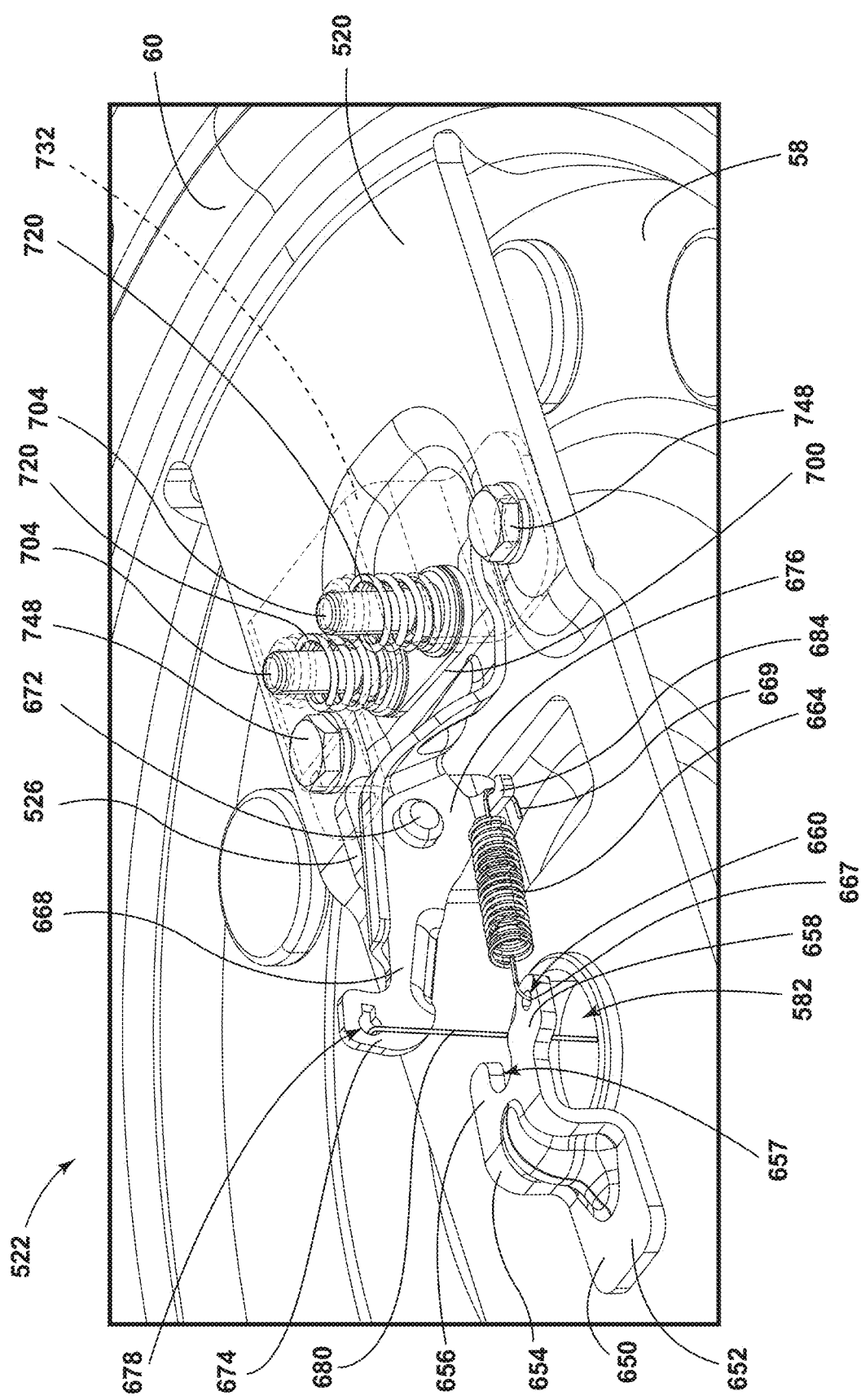
FIG. 23 is a first side perspective view of a locking assembly of a swivel plate assembly according to some examples.
Figure 24:
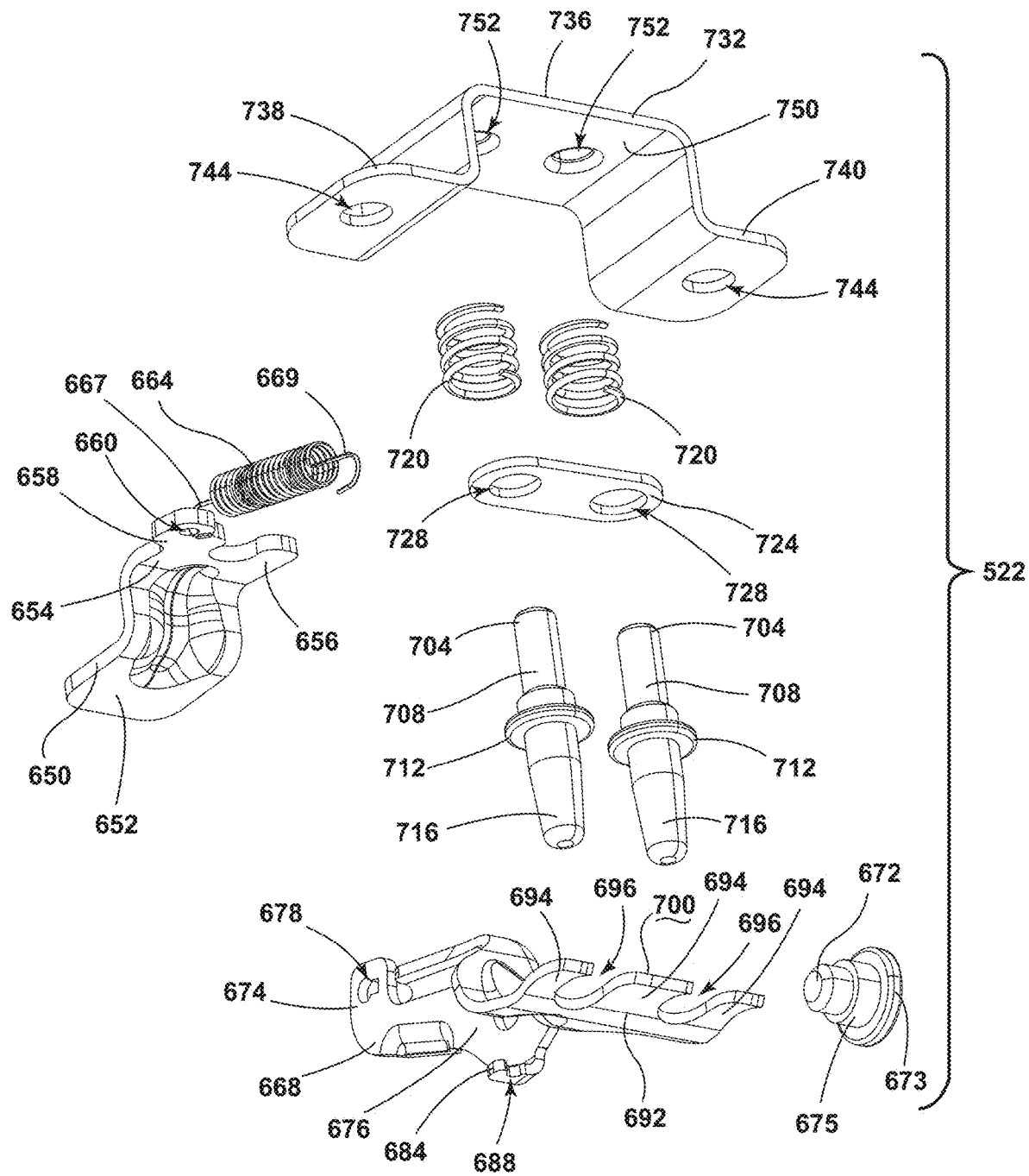
FIG. 24 is an exploded view of the locking assembly of FIG. 23.

Referring now to FIGS. 23 and 24, the locking assembly 522 includes a bracket 650 having a first portion 652 and a second portion 654. The first portion 652 is operably coupled with the cross portion 520 of the second swivel plate 60. The first portion 652 may be fixed to the cross portion 520 using, for example, welding, adhesive, or fasteners. Alternatively, the first portion 652 of the bracket 650 may be integrally formed with the cross portion 520 of the second swivel plate 60. The second portion 654 of the bracket 650 extends upward from the first portion 652 and includes a first arm 656 and a second arm 658. The first and second arms 656, 658 define a space 657. The space 657 is generally centered on the second portion 654 of the bracket 650 and provides clearance for a cable 680 operably coupled to a release lever 668. The bracket 650 may be positioned so that the space 657 is at least partially aligned with the second opening 582 defined by the cross portion 520 of the second swivel plate 60.

The second arm 658 of the second portion 654 of the bracket 650 further defines an opening 660 configured to be coupled with a first end 667 of a spring 664. The spring 664 includes the first end 667 and a second end 669. The spring 664 is positioned to operably couple the bracket 650 and the release lever 668 and to bias the release lever 668 in a first position.

The release lever 668 includes an extension 674 extending rearward of a body portion 676. The extension 674 defines a cable aperture 678 configured to receive an end of the cable 680. The extension 674 of the release lever 668 is positioned proximate the bracket 650 so that the extension 674 may be received by the space 657 defined by the bracket 650 when tension is applied to the cable 680. The extension 674 is further positioned over the second opening 582 defined by the cross portion 520 of the second swivel plate 60 to allow the cable 680 to pass through the second opening 582.

The body portion 676 of the release lever 668 defines the aperture 530 configured to receive a pin 672. The pin 672 includes a head 673 and a body 675. The body 675 is received by the aperture 530 defined by the locking support 524 of the cross portion 520 so that the head 673 is positioned substantially flush with the locking support 524. The body 675 is further received by the aperture 530 of the body portion 676 of the release lever 668 so that the pin 672 couples the body portion 676 to the locking support 524 of the cross portion 520. The pin 672 facilitates rotation of the release lever 668 relative to the locking support 524 between the first position and a second position (see FIGS. 25-26A).

The body portion 676 of the release lever 668 also includes a protrusion 684 extending laterally from the body portion 676. The protrusion 684 defines a notch 688 configured to be coupled the second end 669 of the spring 664. The spring 664 biases the release lever 668 toward the bracket 650 and into the first position, as discussed elsewhere herein.

The release lever 668 further includes a pin support 692 extending from the body portion 676 and laterally opposing the extension 674. The pin support 692 includes a plurality of arms 694 defining a pair of slots 696. The pin support 692 further includes an upper surface 700. The pair of slots 696 is configured to receive pins 704 while the upper surface 700 is configured to at least partially support the pins 704, as discussed elsewhere herein. The pair of slots 696 is spaced apart a predetermined width W2. The width W2 of the spacing of the pair of slots 696 is substantially equivalent to the width W1 of the center wall 588.

The pins 704 include a first portion 708 and a second portion 716. The first portion 708 and the second portion 716 are generally cylindrical. A ring 712 extends circumferentially about each pin between the first portion 708 and the second portion 716. When the pins 704 are received by the pair of slots 696, the ring 712 is substantially flush with the upper surface 700 of the pin support 692. The pins 704 are further spaced apart the predetermined width W2 of the spacing of the pair of slots 696.

A spacer 724 defining a pair of receiving wells 728 is positioned to receive the pins 704 in the pair of receiving wells 728. The spacer 724 is positioned to be substantially flush against the rings 712 of the pins 704. Locking springs 720 are positioned over the first portion 708 of the pins 704 between the spacer 724 and a housing 732. The spacer 724 further ensures simultaneous movement of the pins 704 to prevent one pin 704 from moving without the other pin 704.

The locking springs 720 abut the housing 732 positioned to cover the pins 704 and to partially cover the release lever 668. The housing 732 includes first and second arms 738, 740. Each of the first and second arms 738, 740 defines a receiving well 744 for coupling the housing 732 to the cross portion 520 of the second swivel plate 60. The receiving wells 744 are configured to receive fasteners 748. Alternatively, the arms 738, 740 may be coupled with the cross portion 520 using other attachment means including, for example, welding or adhesive. The housing 732 further includes a central portion 736 positioned over the pins 704 and having a bottom surface 750. The central portion 736 defines a pair of spaces 752 configured to at least partially receive the first portion 708 of the pins 704 as the release lever 668 rotates between the first and second positions.

Figure 25:
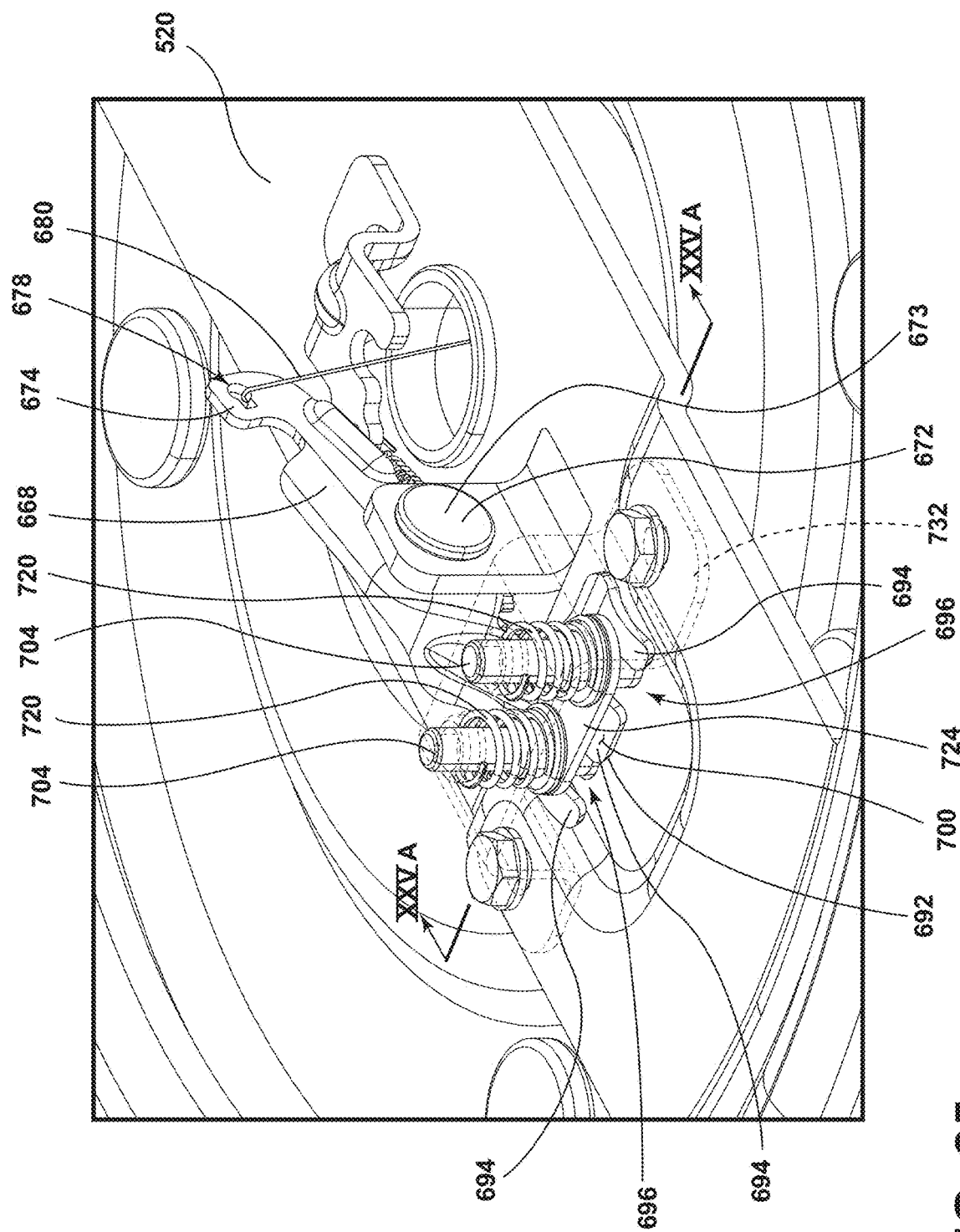
FIG. 25 is a second side perspective view of the locking assembly of FIG. 23 with locking pins in a first position.
Figure 25A:
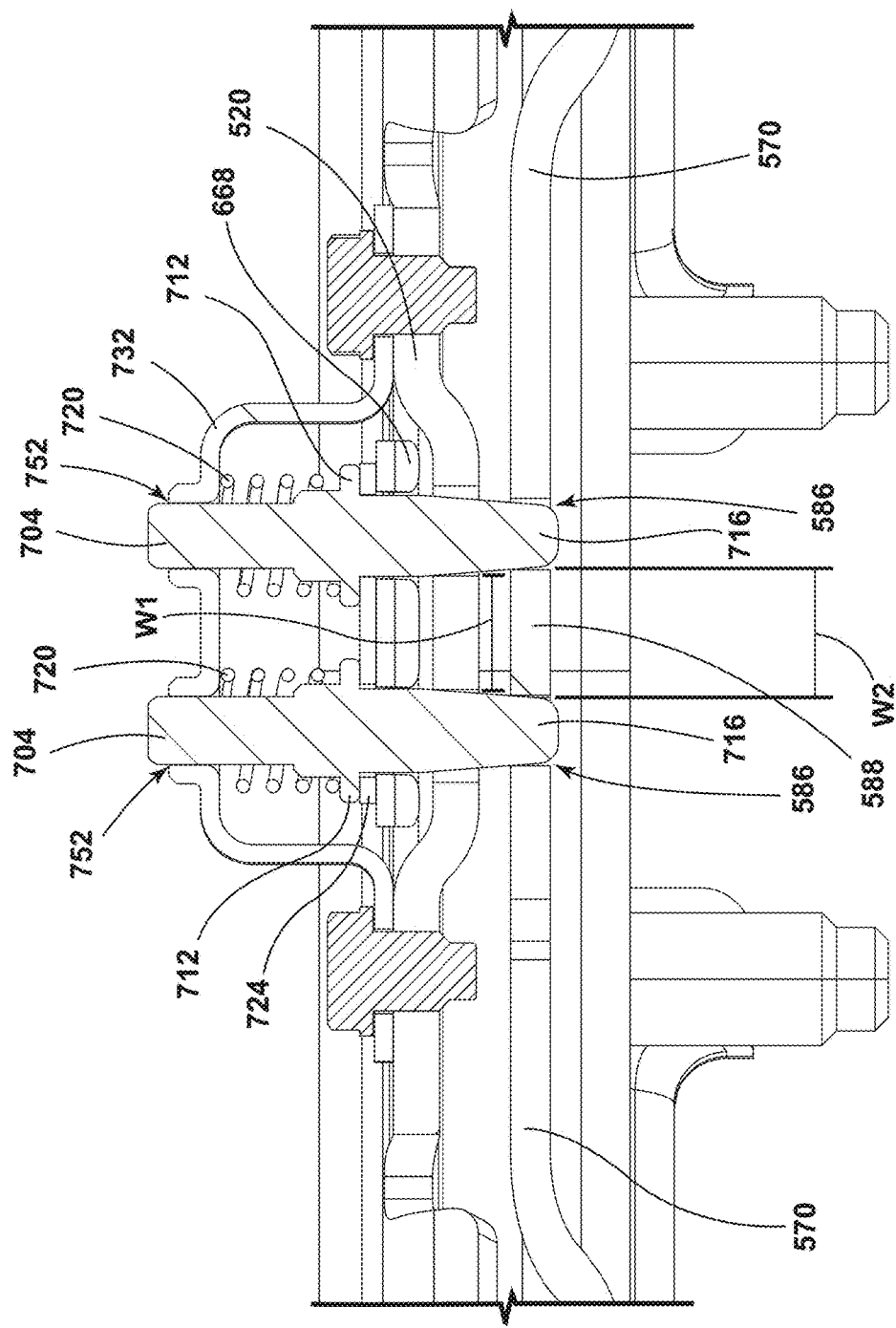
FIG. 25A is a cross-sectional view of the locking assembly of FIG. 25 taken along line XXVA-XXVA.
Figure 26:
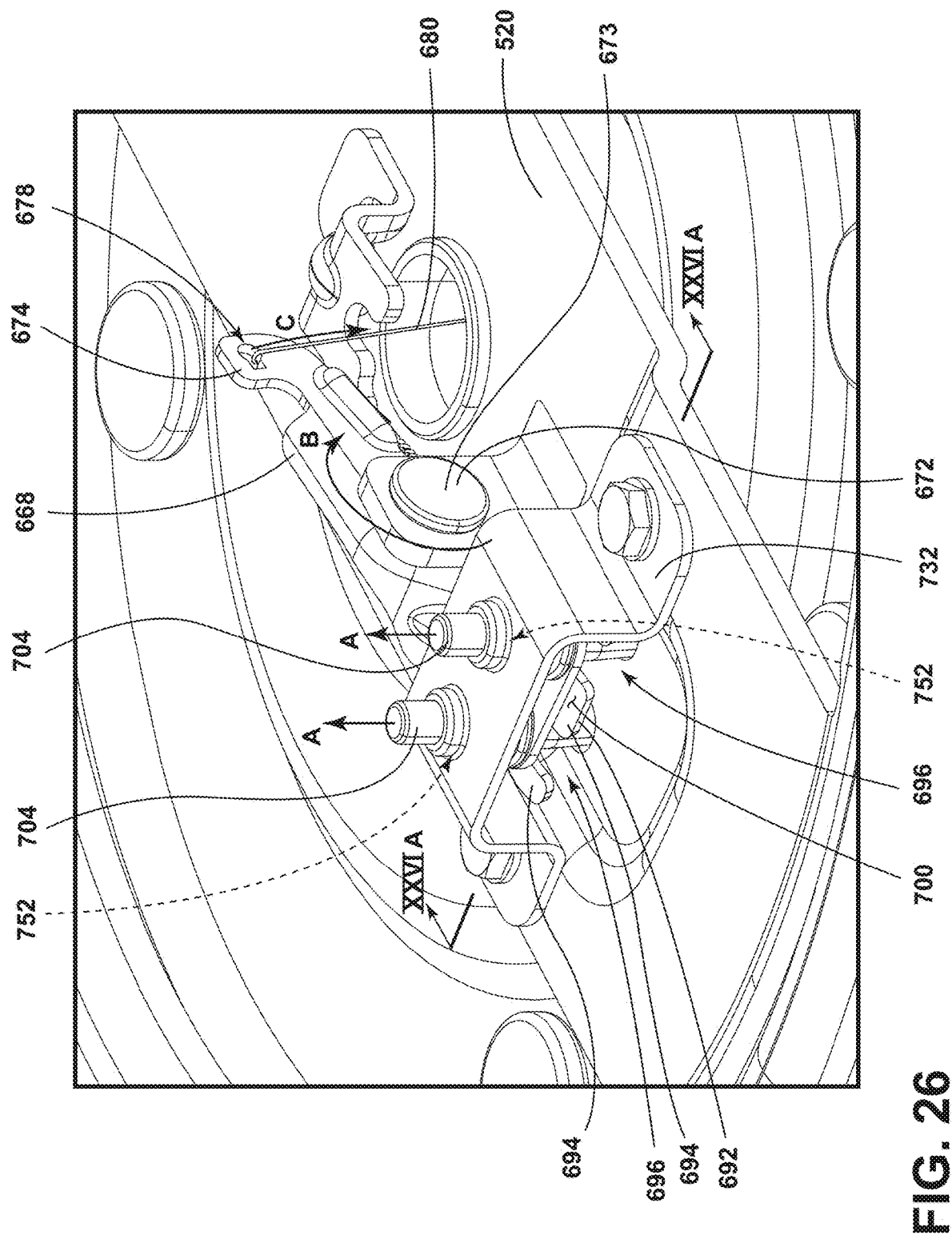
FIG. 26 is a second side perspective view of the locking assembly of FIG. 23 with locking pins in a second position.
Figure 26A:
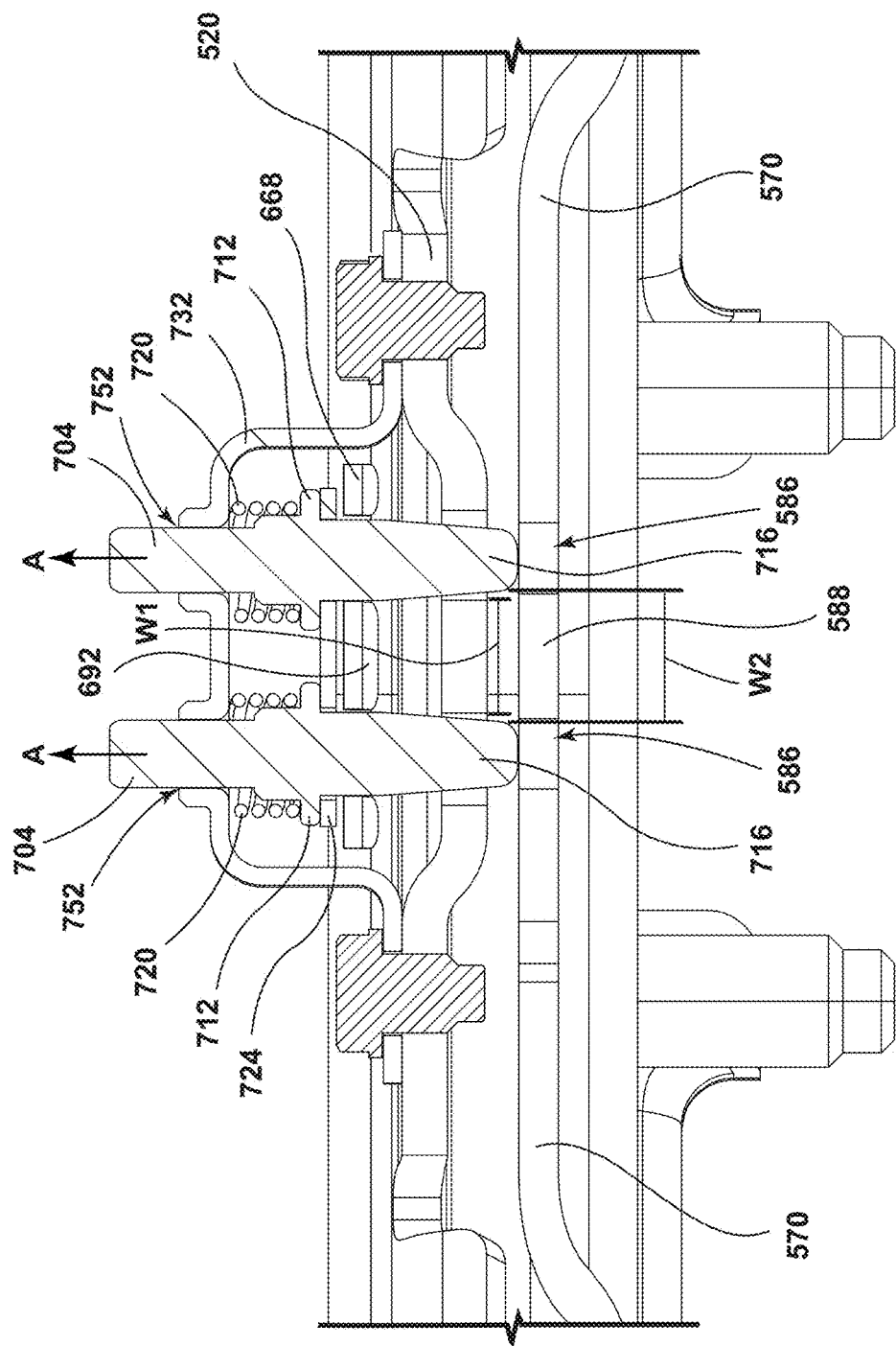
FIG. 26A is a cross-sectional view of the locking assembly of FIG. 26 taken along line XXVIA-XXVIA.

As discussed previously, the locking assembly 522 is operable between a first position (FIGS. 25 and 25A) and a second position (FIGS. 26 and 26A). As shown in FIGS. 25 and 25A, when the locking assembly 522 is in the first position the release lever 668 is biased in the first position by the spring 664. When the release lever 668 is in the first position, the pin support 692 is in a lowered position so that the locking springs 720 are in a decompressed state. When the pin support 692 is in a lowered position, the pins 704 are engaged with one of the plurality of pairs of engagement slots 586 of the first swivel plate 58. When the pins 704 are engaged with one of the plurality of pairs of engagement slots 586, the center wall 588 is positioned between the pins 704. The pins 704 are substantially flush with the center wall 588 when the pins 704 are engaged with one of the plurality of pairs of engagement slots 586. The flush positioning eliminates chuck and prevents each of the pins 704 from being able to laterally slide within the engagement slots 586.

As shown in FIGS. 26 and 26A, when the locking assembly 522 is in the second position, the cable 680 pulls the release lever 668 into the second position, moving the pin support 692 towards the bottom surface 750 of the housing 732. As the pin support 692 moves, the locking springs 720 are compressed between the spacer 724 and the bottom surface 750 of the housing 732. The pins 704 are at least partially received by the pair of spaces 752 of the central portion 736 of the housing 732 when the locking assembly 522 is in the second position. The movement disengages the pins 704 from the plurality of pairs of engagement slots 586 of the first swivel plate 58. When the pins 704 are disengaged, the first swivel plate 58 may be rotated relative to the second swivel plate 60. It will be understood that the cable 680 may be coupled to a lever, a motor, or any other means of applying tension to the cable 680 to move the locking assembly 522 from the first position to the second position. When the tension on the cable 680 is released, the locking springs 720 bias the pins 704 back toward the first swivel plate 58 and the spring 664 biases the release lever 668 back into the first position, locking the pins 704 and preventing further rotation of the first swivel plate 58.

Figure 27:
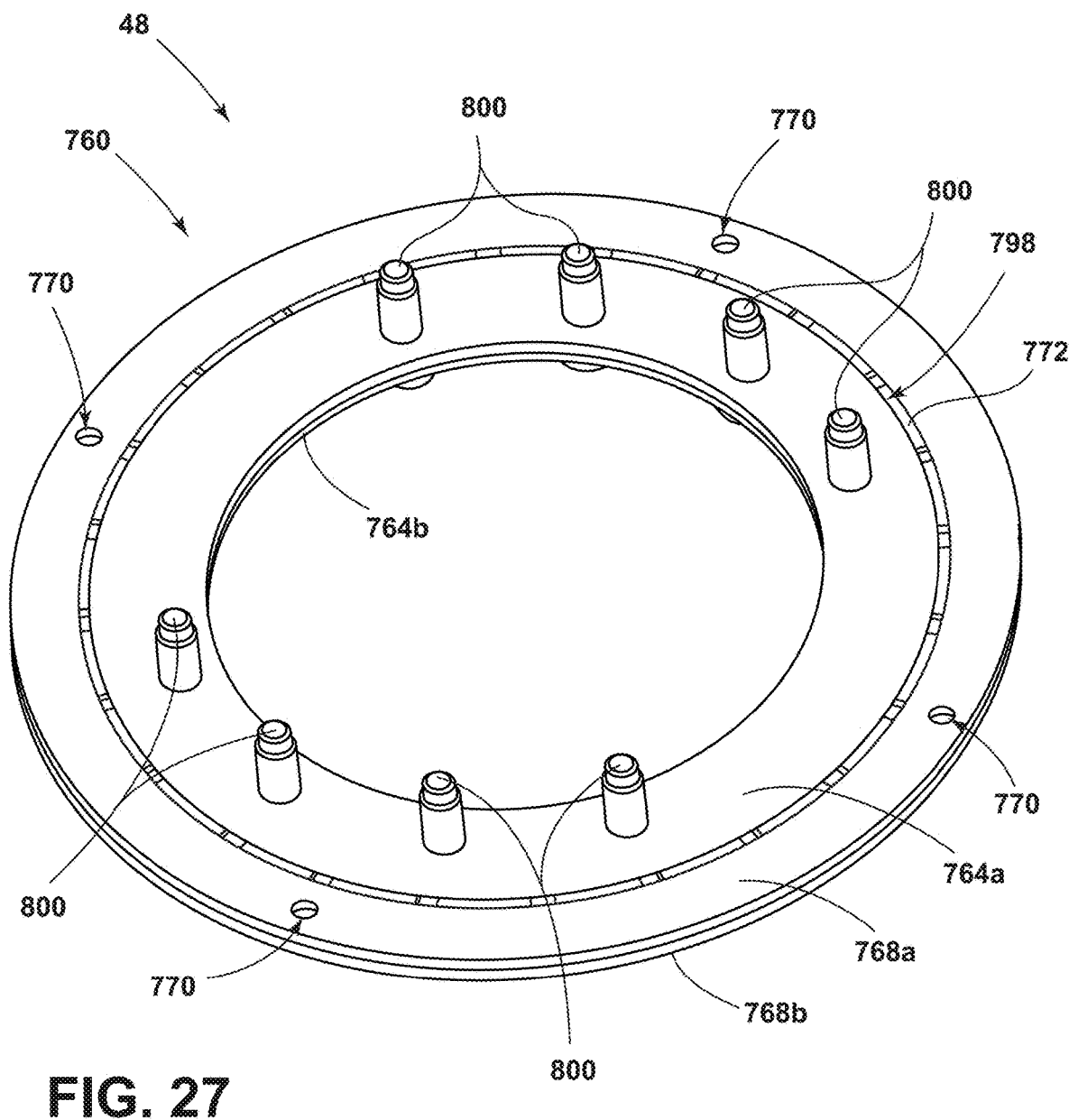
FIG. 27 is a top perspective view of a swivel plate assembly according to some examples.
Figure 28:
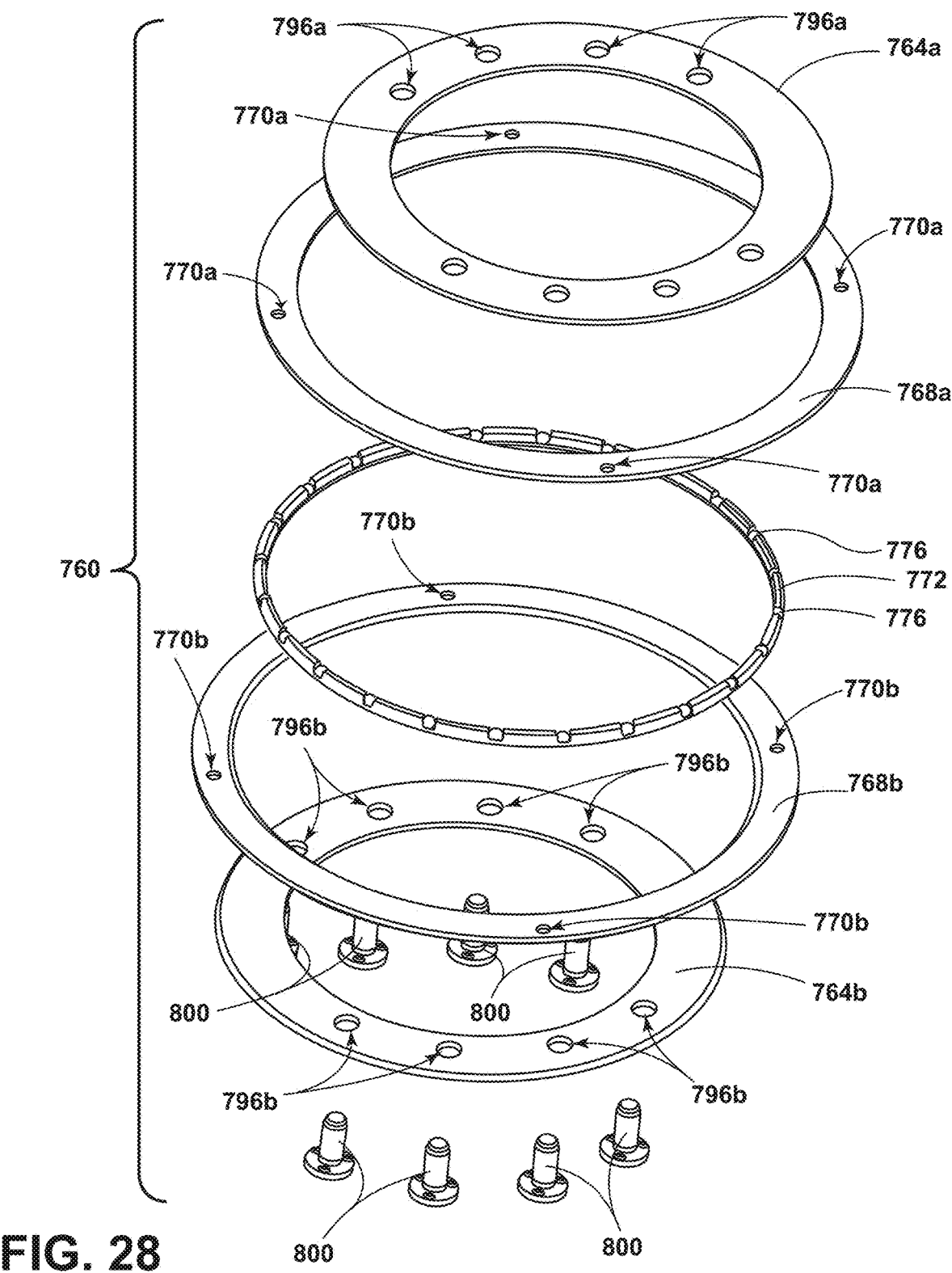
FIG. 28 is an exploded view of the swivel plates of the swivel plate assembly of FIG. 27.

Referring now to FIGS. 27 and 28, according to some examples, the swivel plate assembly 48 may be a Conrad ball bearing assembly 760. The Conrad ball bearing assembly 760 includes a pair of inner plates 764a, 764b and a pair of outer plates 768a, 768b. The first inner plate 764a defines a plurality of fastener spaces 796a. The second inner plate 764b defines a plurality of fastener spaces 796b configured to be aligned with the first fastener spaces 796a to form a plurality of single fastener spaces 796 when the first inner plate 764a and the second inner plate 764b are coupled together. The fastener spaces 796a, 796b are configured to receive fasteners 800 configured to couple the Conrad ball bearing assembly 760 to a frame (see FIG. 17). The first inner plates 764a may be coupled to the second inner plate 764b using, for example, adhesive, welding, laser welding, or fasteners to form a single inner plate.

The first and second outer plates 768a, 768b each define a plurality of spaces 770a, 770b configured to align to form a single plurality of spaces 770. Each of the plurality of spaces 770 is configured to couple the first and second outer plates 768a, 768b to a portion of the seating assembly 14 (see FIGS. 1-2B) when the first and second outer plates 768a, 768b are coupled together. The first outer plate 768a may be coupled to the second outer plate 768b using, for example, the same adhesive, welding, laser welding, or fasteners to form a single outer plate.

Figure 29:
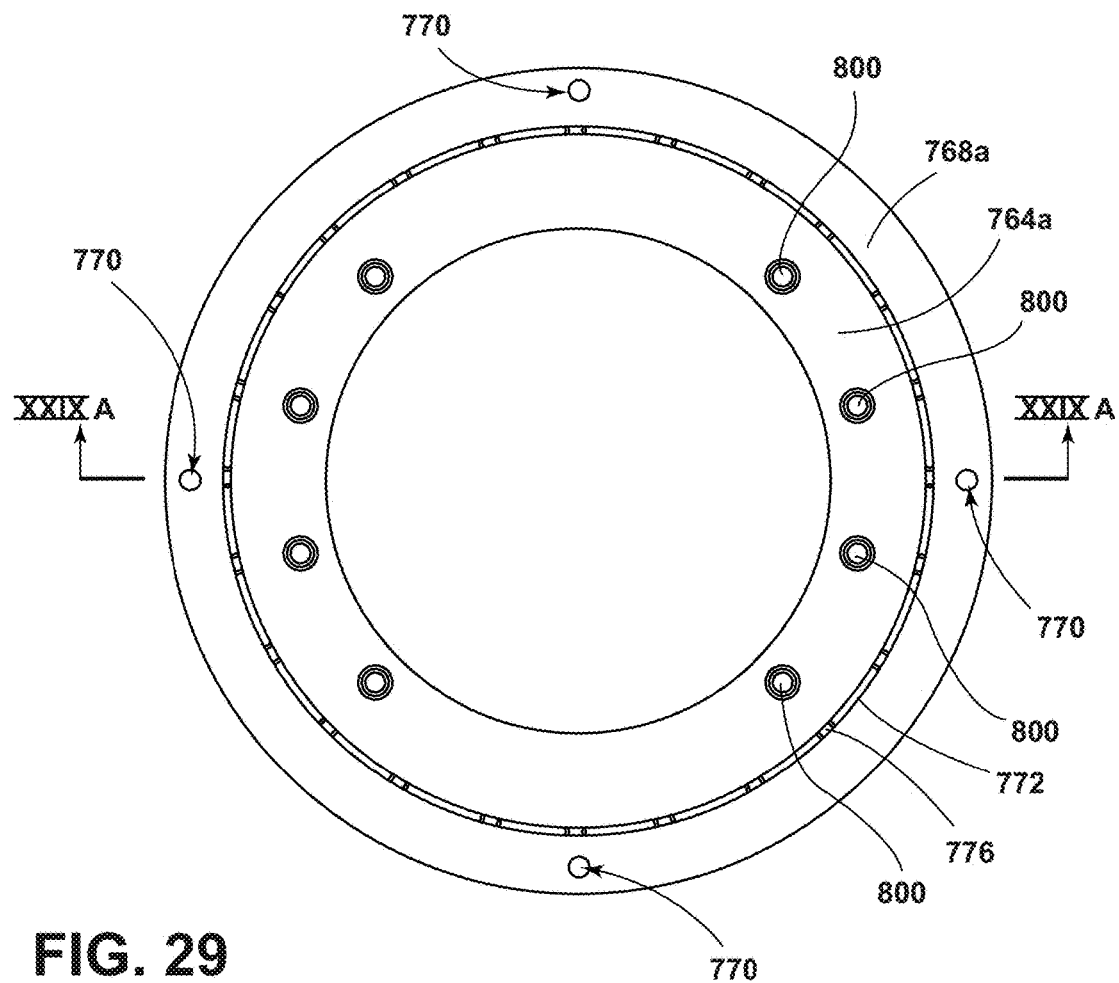
FIG. 29 is a top profile view of the swivel plates of the swivel plate assembly of FIG. 27.
Figure 29A:
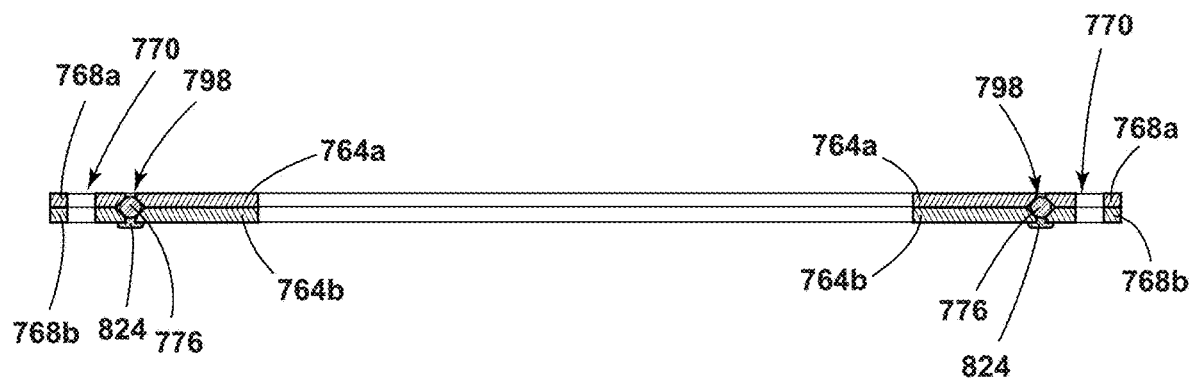
FIG. 29A is a cross-sectional view of the swivel plates of FIG. 29 taken along line XXIXA-XXIXA.

Referring now to FIGS. 28-29A, the first and second outer plates 768a, 768b are positioned circumferentially around the first and second inner plates 764a, 764b such that the first and second inner plates 764a, 764b and the first and second outer plates 768a, 768b define a channel 798 configured to receive a ball bearing ring 772. Each of the first and second inner plates 764a, 764b and the first and second outer plates 768a, 768b may have an angled edge such that the channel 798 has a diamond cross section. However, it will be understood that the channel 798 may have any cross-section that may be used to housing the ball bearing ring 772 without departing from the scope of the present disclosure.

The ball bearing ring 772 includes a plurality of ball bearings 776 spaced around the circumference of the ball bearing ring 772. According to various examples, the ball bearings 776 may be recessed into the ball bearing ring 772. In other examples, the ball bearings 776 may be positioned to protrude from the ball bearing ring 772. In other examples, the ball bearing ring 772 may be a ball bearing cage. The ball bearing ring 772 is positioned within the channel 798 so that at least a portion of the ball bearings 776 of the ball bearing ring 772 are flush with each of the first and second inner plates 764a, 764b and the first and second outer plates 768a, 768b to facilitate rotation. According to some examples, the ball bearing ring 772 may have a bottom protrusion 824 configured to at least partially secure the ball bearing ring 772 within the channel 798, as shown in FIG. 29A.

The use of any one of the inset plate assembly 298, the dual plate assembly 440, or the Conrad ball bearing assembly 760 provides the rotational movement to the seating system 10 necessary to allow for the various positioning of the seating assemblies 14, as shown in FIGS. 5A-10. The rotational movement of the seating assemblies 14 and the ability of an occupant to translate the various seating assemblies 14 along track assemblies 102, 104 provides additional ingress and egress for occupants of the vehicle as well as additional storage without having to remove any of the seating assemblies 14.

It will be understood by one having ordinary skill in the art that construction of the described concepts, and other components, is not limited to any specific material. Other exemplary embodiments of the concepts disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A swivel plate assembly comprising: a first swivel plate coupled to a second swivel plate, wherein each of the first and second swivel plates includes a first portion and a second portion; a space defined by the first swivel plate and the second swivel plate; a ball bearing assembly positioned substantially flush with one of the first and second swivel plates; one or more brackets coupled with the first swivel plate and extending at least partially over the second swivel plate to maintain engagement of the second swivel plate with the first swivel plate; and wherein the second portions of the first and second swivel plates are circumferentially encompassed by the first portions of the first and second swivel plates, and further wherein the second portions of the first and second swivel plates are rotatable relative to the first portions of the first and second swivel plates.

2. The swivel plate assembly of claim 1, wherein the first portion of the first swivel plate is fixedly coupled to the first portion of the second swivel plate and the second portion of the first swivel plate is fixedly coupled to the second portion of the second swivel plate.

3. The swivel plate assembly of claim 1, wherein the first portion of the first swivel plate is coupled to the first portion of the second swivel plate by welding, and further wherein the second portion of the first swivel plate is coupled to the second portion of the second swivel plate by welding.

4. The swivel plate assembly of claim 1, wherein one of the first and second portions of the first and second swivel plates includes an angled edge positioned to abut the ball bearing assembly.

5. The swivel plate assembly of claim 1, wherein one of the first and second swivel plates defines a plurality of fastener spaces configured to receive fasteners to couple the swivel plate assembly with a seating assembly.

6. The swivel plate assembly of claim 1, wherein the first portion of the first plate is aligned with the first portion of the second plate, and further wherein the second portion of the first plate abuts the second portion of the second plate.

7. The swivel plate assembly of claim 1, wherein a rotation feature is positioned within a cavity at least partially defined by the second plate.

8. A swivel plate assembly comprising:
 a first swivel plate coupled with a second swivel plate, wherein the first swivel plate includes a first inner portion engaged with a second inner portion of the second swivel plate, and further wherein the first swivel plate includes a first outer portion at least partially encompassing the first inner portion and a second outer portion at least partially encompassing the second inner portion;
 a space defined between the first swivel plate and the second swivel plate;
 a rotation assembly positioned within the space and in contact with one of the first and second swivel plates, wherein the rotation assembly is configured to facilitate low friction rotation of the second swivel plate relative to the first swivel plate; and
 a plurality of brackets coupled with the first swivel plate and extending at least partially over the second swivel plate to maintain engagement second swivel plate with the first swivel plate.

9. The swivel plate assembly of claim 8, wherein the rotation assembly is one of a ball bearing assembly and a lubricant layer.

10. The swivel plate assembly of claim 8, wherein the first inner portion of the first swivel plate defines a receiving feature configured to at least partially receive the second inner portion of the second swivel plate.

11. The swivel plate assembly of claim 8, wherein the second swivel plate includes a rim at least partially defining the space.

12. A swivel plate assembly comprising:
 a first swivel plate coupled to a second swivel plate, wherein each of the first and second swivel plates includes a first portion and a second portion;
 a channel defined between the first swivel plate and the second swivel plate;
 a ball bearing assembly positioned within the channel, wherein a ball bearing of the ball bearing assembly is positioned substantially flush with the first and second swivel plates; and
 a locking assembly positioned on the second swivel plate and comprising:
  a pair of pins spaced a first distance apart and extending from a release lever; and
  a first apart of receiving spaces defined by the second swivel plate and spaced a second distance apart, the first distance being equal to the second distance.

13. The swivel plate assembly of claim 12, wherein the first pair of receiving spaces is spaced apart by a center wall, and further wherein each of the pair of pins is substantially flush with the center wall partially defining each of the pair of receiving spaces when the pair of pins is engaged with the pair of receiving spaces.

14. The swivel plate assembly of claim 12, wherein the first portion of the first swivel plate is fixedly coupled to the first portion of the second swivel plate, and the second portion of the first swivel plate is fixedly coupled to the second portion of the second swivel plate.

15. The swivel plate assembly of claim 12, wherein the first portion of the first swivel plate is coupled to the first portion of the second swivel plate by welding, and further wherein the second portion of the first swivel plate is coupled to the second portion of the second swivel plate by welding.

16. The swivel plate assembly of claim 12, wherein the second portions of the first and second swivel plates are circumferentially encompassed by the first portions of the first and second swivel plates, and further wherein the second portions of the first and second swivel plates are rotatable relative to the first portions of the first and second swivel plates.

17. The swivel plate assembly of claim 12, wherein one of the first and second portions of the first and second swivel plates includes an angled edge positioned to abut the ball bearing assembly.

* * * * *

UNITED STATES PATENT AND TRADEMARK OFFICE
CERTIFICATE OF CORRECTION

| | |
|---|---|
| PATENT NO. | : 11,292,367 B2 |
| APPLICATION NO. | : 17/060673 |
| DATED | : April 5, 2022 |
| INVENTOR(S) | : Aktas et al. |

It is certified that error appears in the above-identified patent and that said Letters Patent is hereby corrected as shown below:

In the Claims

Column 22:
Claim 8, Line 6:
After "engagement" insert --of the--.
Claim 12, Line 32:
"apart" should be --pair--.

Signed and Sealed this
Thirty-first Day of May, 2022

Katherine Kelly Vidal
*Director of the United States Patent and Trademark Office*